United States Patent
Zahedi et al.

(10) Patent No.: US 11,191,343 B2
(45) Date of Patent: Dec. 7, 2021

(54) SOURCE CAPTURE APPARATUS FOR MANICURE TABLES

(71) Applicant: Healthy Air, Inc., Sunny Isles Beach, FL (US)

(72) Inventors: Arya J. Zahedi, Miami, FL (US); Karim Zahedi, Sunny Isles Beach, FL (US)

(73) Assignee: Healthy Air, Inc., Sunny Isles Beach, FL (US)

( * ) Notice: Subject to any disclaimer, the term of this patent is extended or adjusted under 35 U.S.C. 154(b) by 193 days.

(21) Appl. No.: 16/410,133

(22) Filed: May 13, 2019

(65) Prior Publication Data

US 2019/0343264 A1 Nov. 14, 2019

Related U.S. Application Data

(60) Provisional application No. 62/670,152, filed on May 11, 2018.

(51) Int. Cl.
| | |
|---|---|
| *B01D 46/00* | (2006.01) |
| *A45D 29/00* | (2006.01) |
| *A45D 44/02* | (2006.01) |
| *B08B 15/00* | (2006.01) |
| *B01D 53/04* | (2006.01) |
| *B01D 46/52* | (2006.01) |

(52) U.S. Cl.
CPC .......... *A45D 44/02* (2013.01); *A45D 29/00* (2013.01); *B01D 46/0032* (2013.01); *B01D 46/0036* (2013.01); *B01D 46/0038* (2013.01); *B01D 46/0043* (2013.01); *B01D 46/521* (2013.01); *B01D 53/04* (2013.01); *B01D 2253/102* (2013.01); *B01D 2257/708* (2013.01)

(58) Field of Classification Search
CPC .............. B01D 46/0032; B01D 46/521; B01D 2257/708; B01D 2258/06; B08B 2215/006; B08B 15/005; A45D 29/00
USPC ....... 55/385.1, 398.2, 360; 96/19, 397; 95/8; 108/50.13; 454/66
See application file for complete search history.

(56) References Cited

U.S. PATENT DOCUMENTS

| | | | |
|---|---|---|---|
| 4,280,519 A | 7/1981 | Chapman | |
| 4,852,468 A * | 8/1989 | Harris | B08B 15/02 |
| | | | 454/56 |
| 5,112,373 A | 5/1992 | Pham | |
| 5,336,128 A * | 8/1994 | Birdsong | A45D 29/00 |
| | | | 454/56 |
| 5,464,029 A * | 11/1995 | Rentz | A45D 29/00 |
| | | | 132/73 |
| 5,787,903 A | 8/1998 | Blackshear | |
| 5,816,906 A | 10/1998 | Mai | |

(Continued)

OTHER PUBLICATIONS

Alaves, et al., Characterization of Indoor Air Contaminants in a Randomly Selected Set of Commercial Nail Salons in Salt Lake County, Utah, USA. International Journal of Environmental Health Research, Jan. 2013, U.S.

(Continued)

*Primary Examiner* — Minh Chau T Pham
(74) *Attorney, Agent, or Firm* — James G. Passé; Passé Intellectual Property, LLC

(57) ABSTRACT

The invention is a table top filtration device designed to filter noxious fumes on or near the table. In one embodiment, the tables are manicure and pedicure tables.

6 Claims, 29 Drawing Sheets

(56) References Cited

U.S. PATENT DOCUMENTS

| | | | |
|---|---|---|---|
| 6,116,249 A | 9/2000 | Tuffery | |
| 6,444,002 B1* | 9/2002 | Mai | A45D 29/00 454/56 |
| 8,430,940 B2* | 4/2013 | Nguyen | A45D 29/00 55/385.2 |
| 9,114,444 B1* | 8/2015 | Lam | B08B 15/00 |
| 2001/0023172 A1* | 9/2001 | Winkelman | A45D 29/00 454/56 |
| 2008/0216647 A1* | 9/2008 | Phan | B01D 46/46 95/8 |
| 2008/0314248 A1* | 12/2008 | Peteln | B01D 53/18 96/1 |
| 2012/0045981 A1 | 2/2012 | Nguyen | |
| 2020/0346151 A1* | 11/2020 | Zahaf | B01D 46/0005 |

OTHER PUBLICATIONS

Marty, Adam, Ethyl Methacrylate and Methyl Methacrylate Exposure Among Fingernail Sculptors, University of South Florida—The Graduate School at Scholar Commons, 2007, USA.

Goldin, et al., Indoor Air Quality Survey of Nail Salons in Boston, J Immigrant Minority Health, 2014, Springer, Roxbury, USA.

Quach, et al., Characterizing Workplace Exposures In Vietnamese Women Working in California Nail Salons, American Journal of Public Health, 2011, vol. 101, USA.

\* cited by examiner

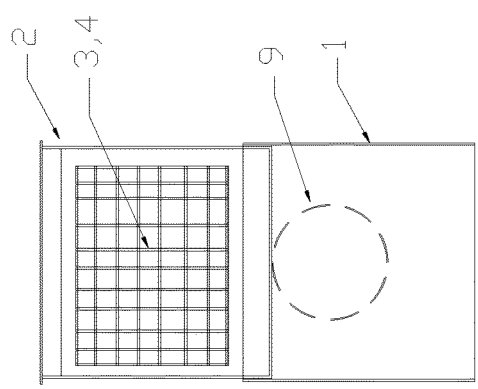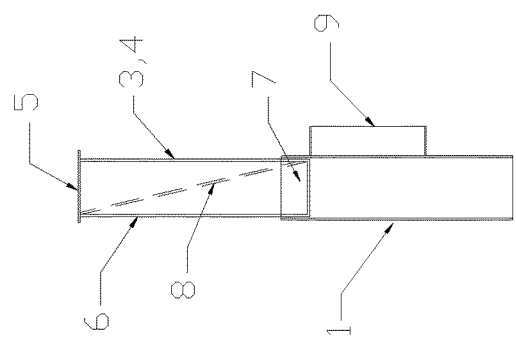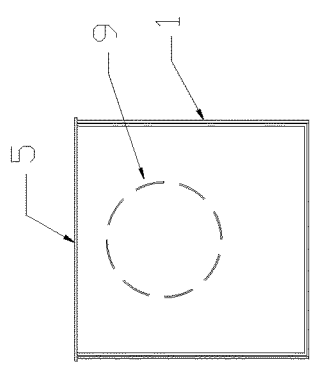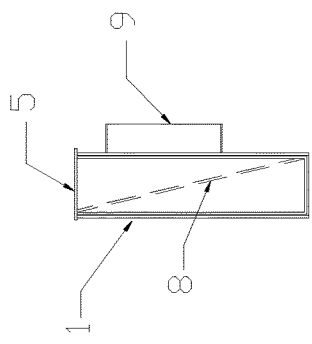

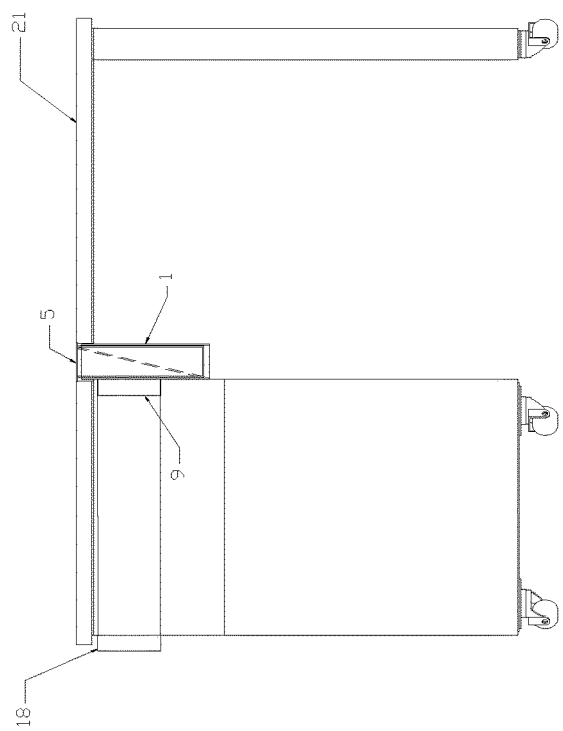
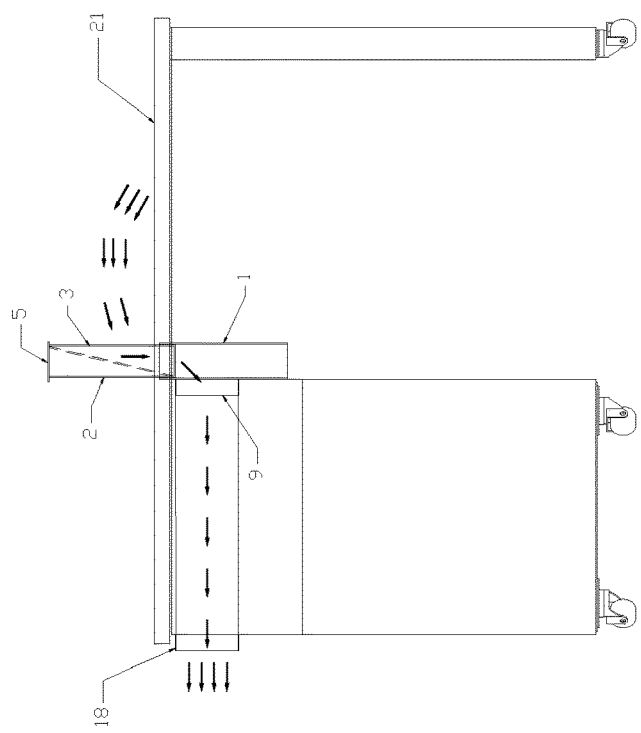

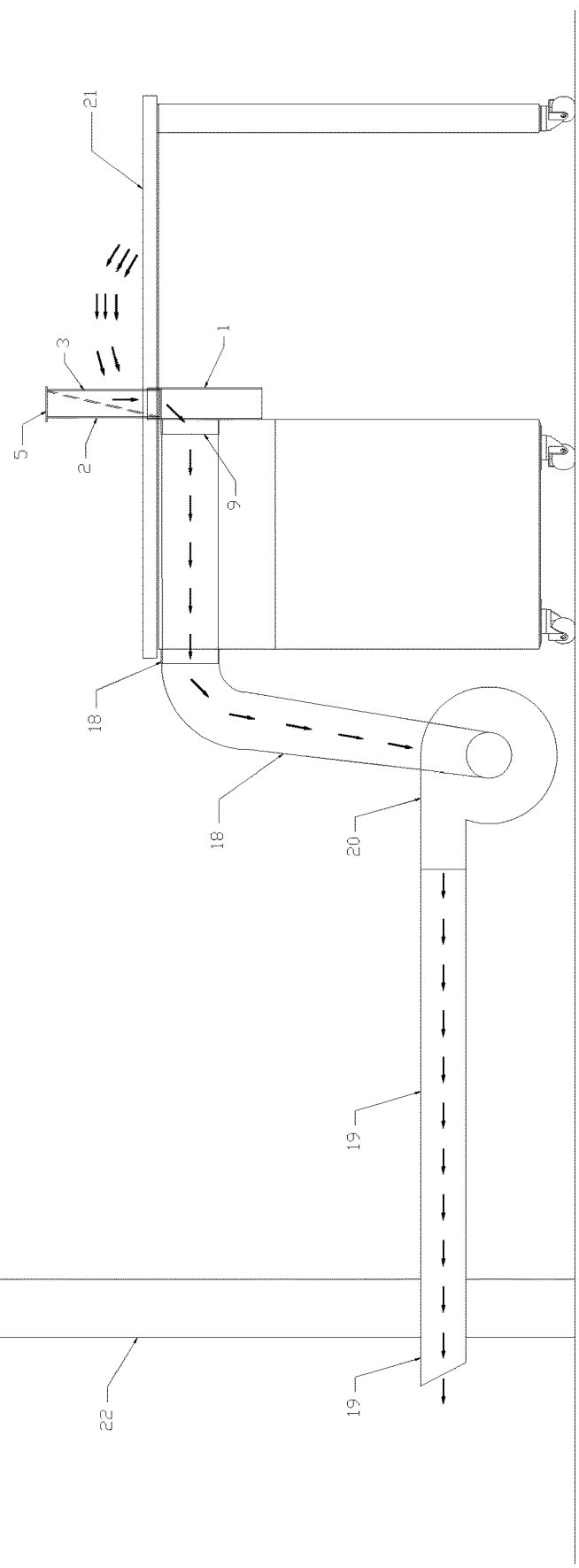

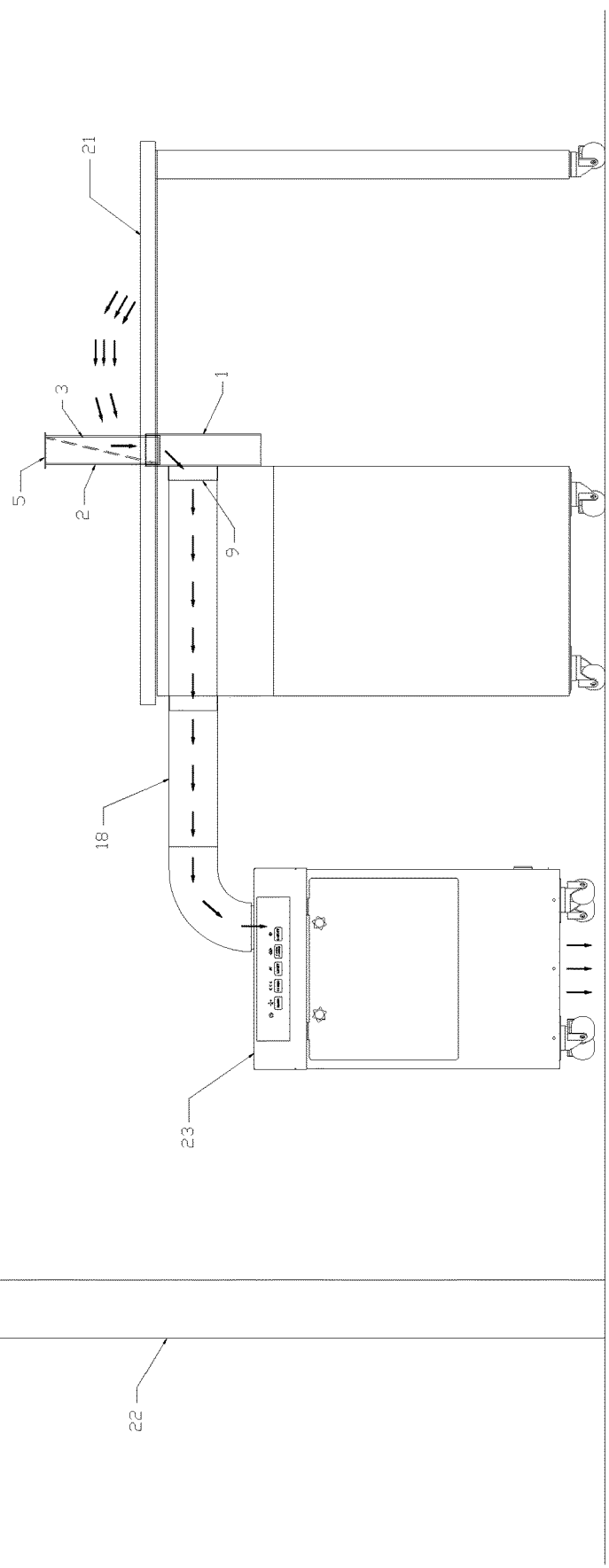

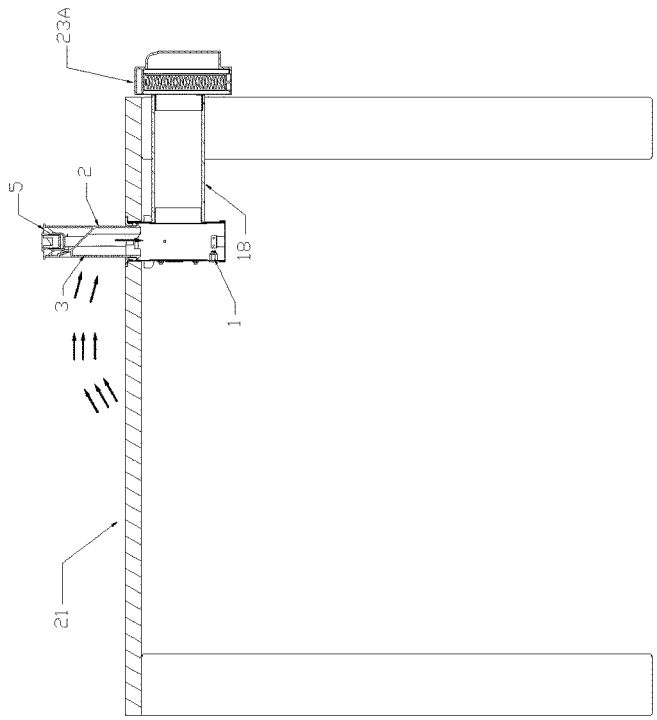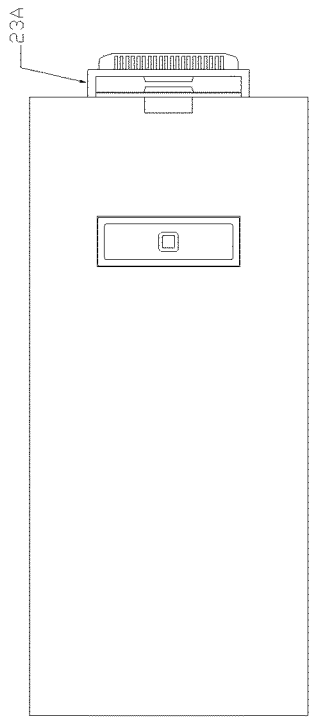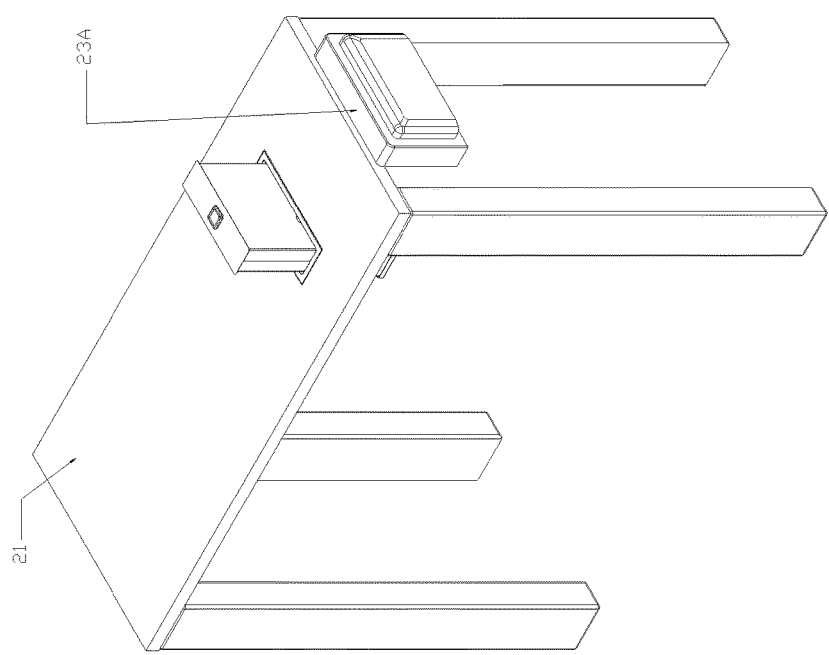

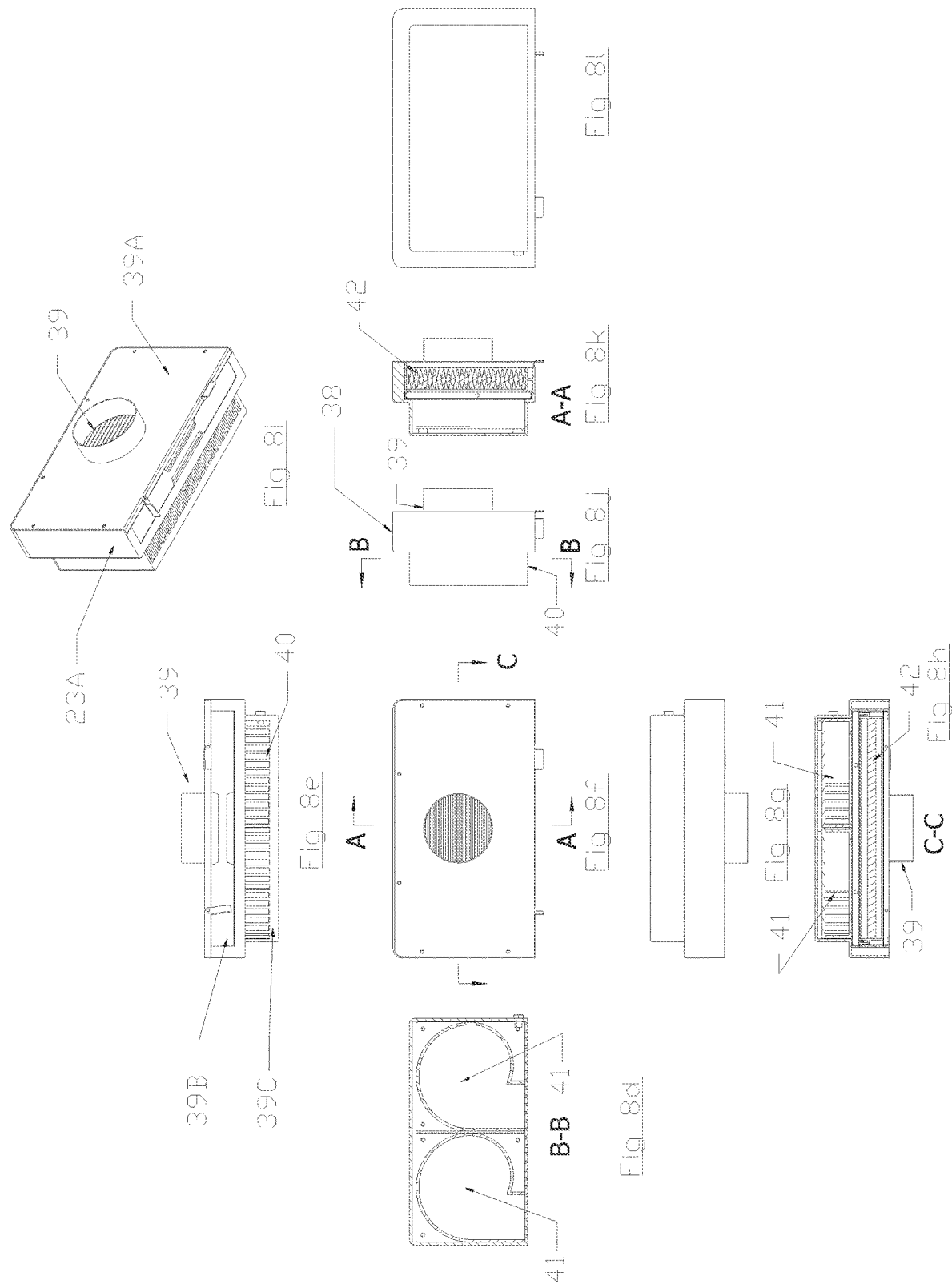

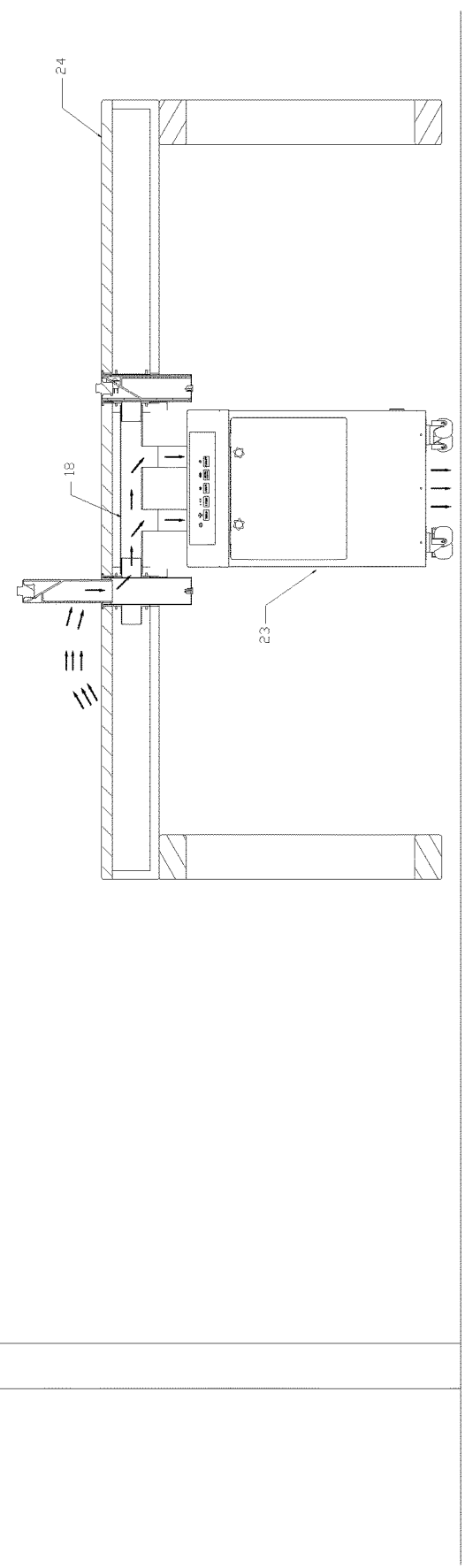

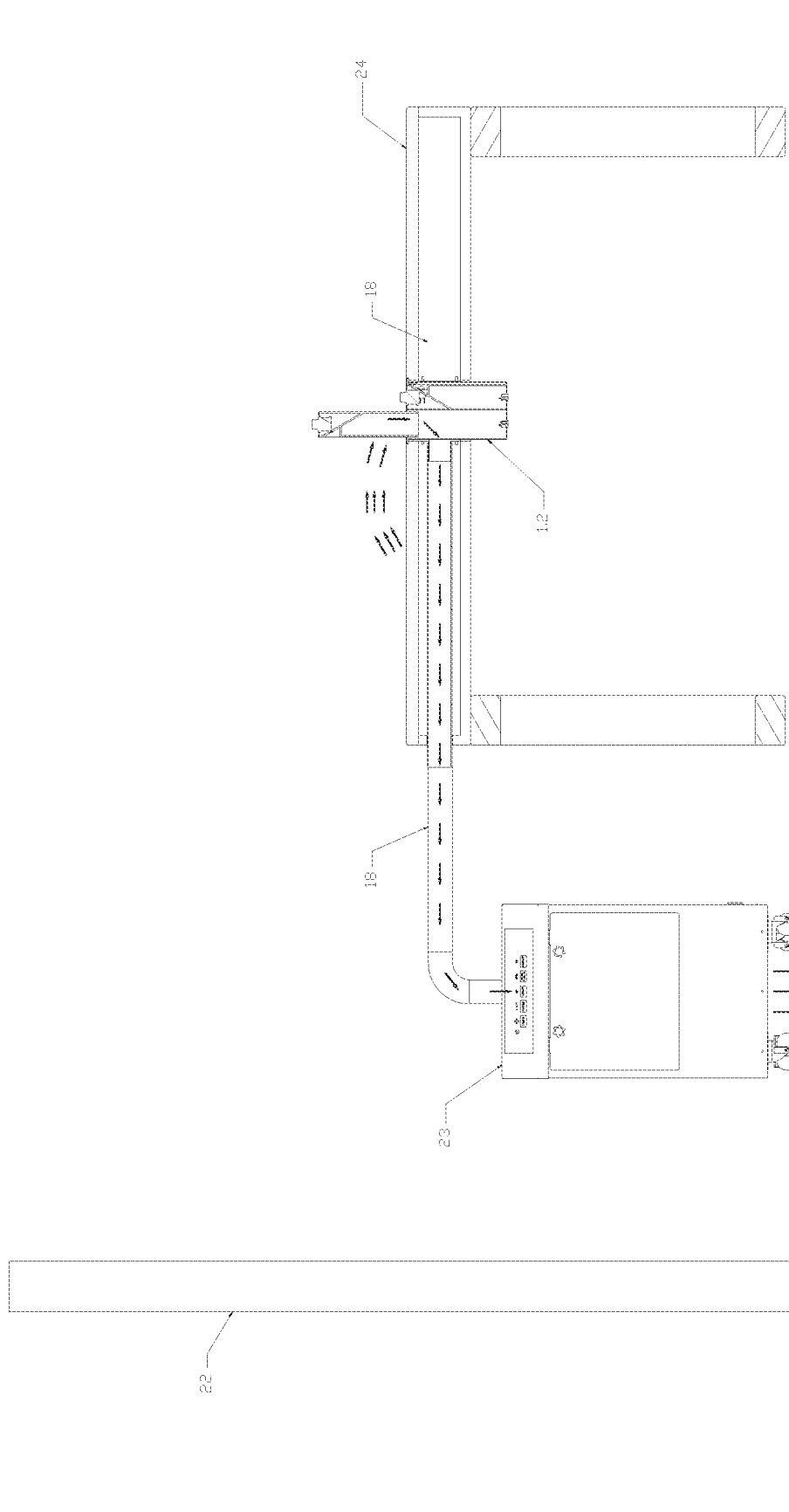

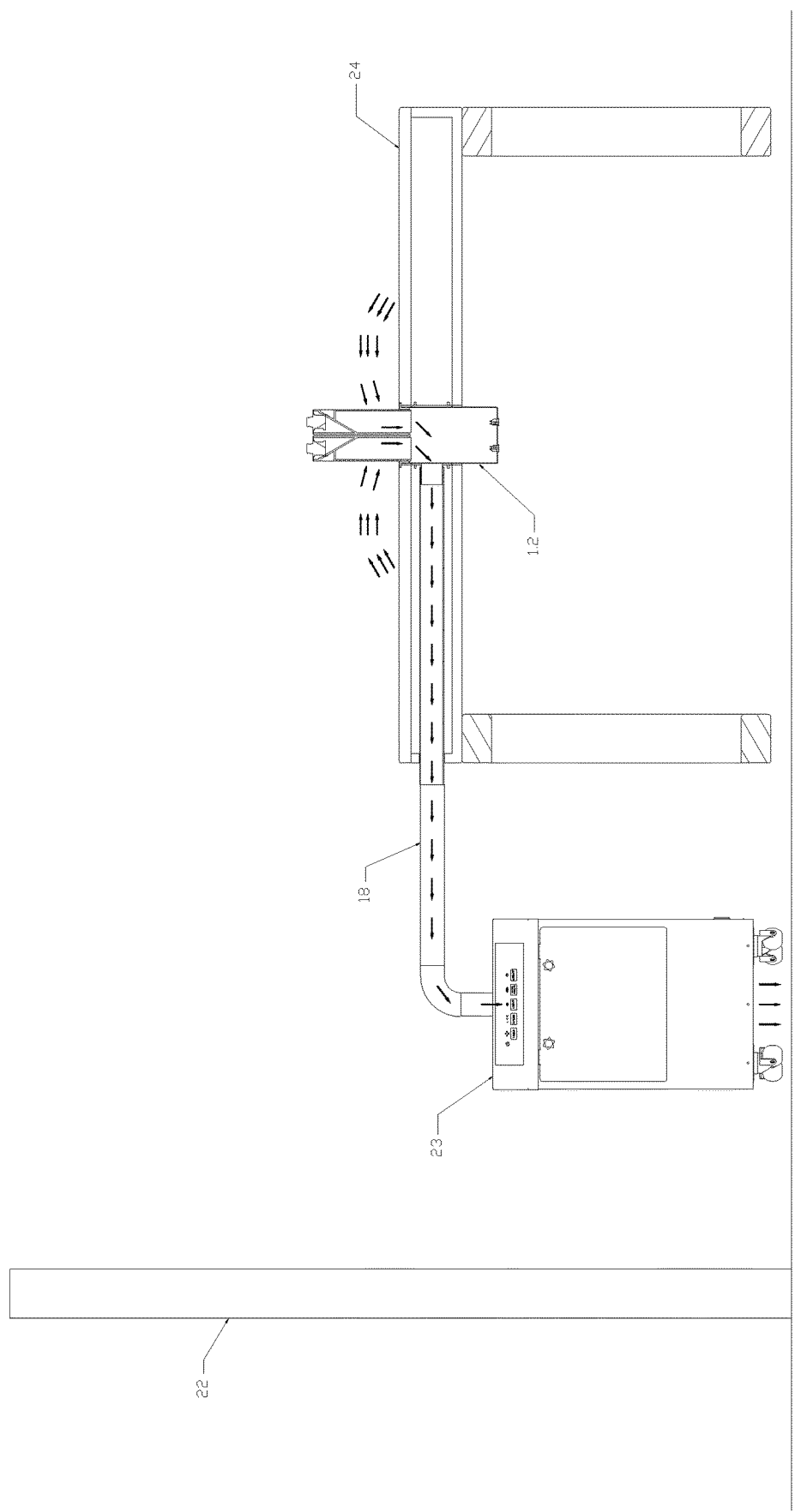

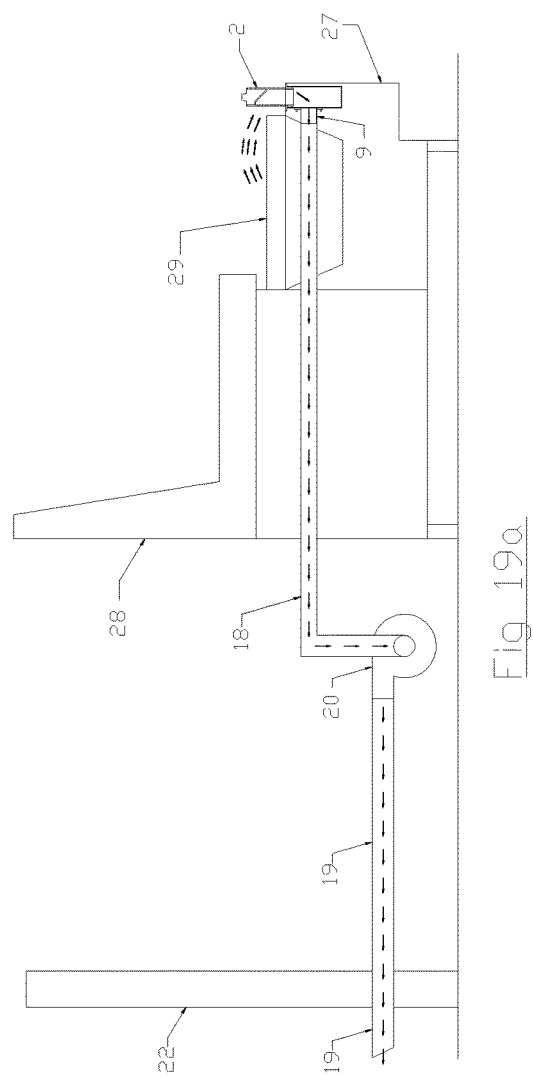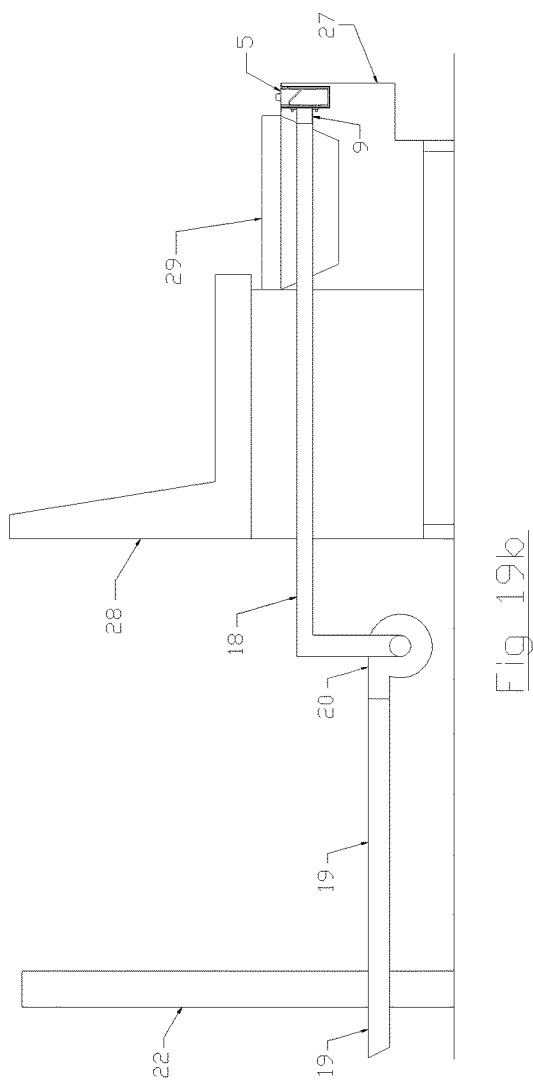

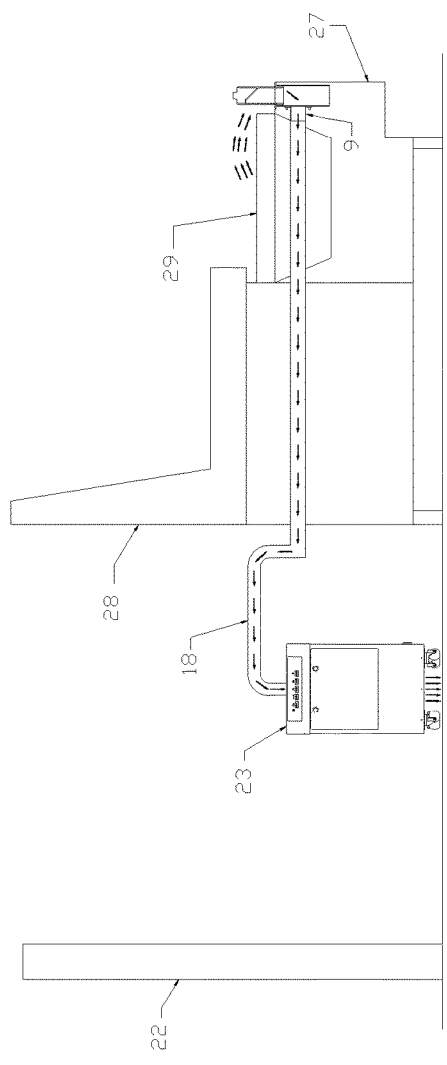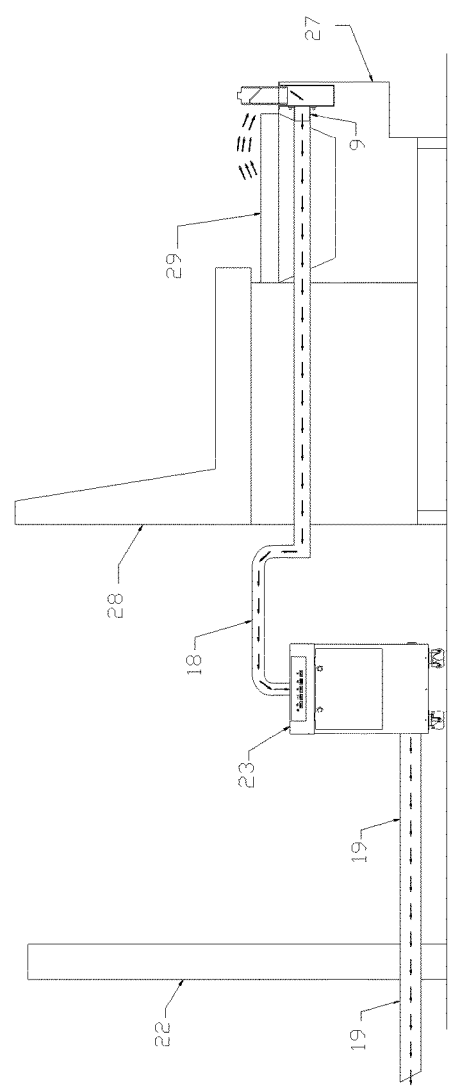

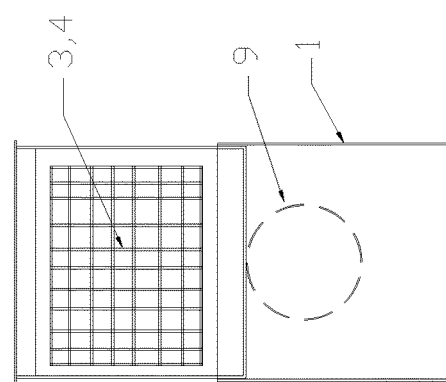
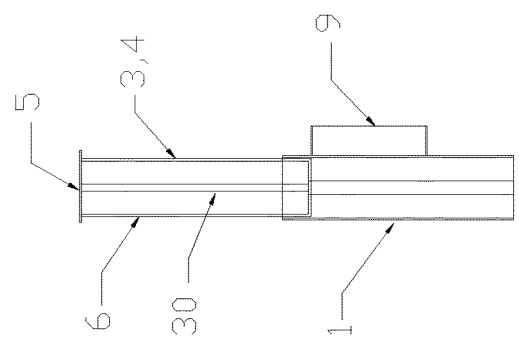
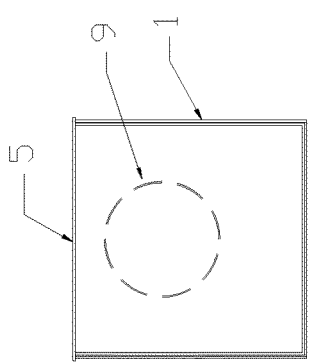
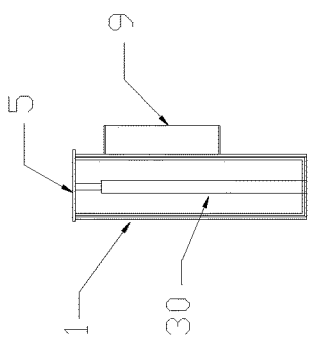

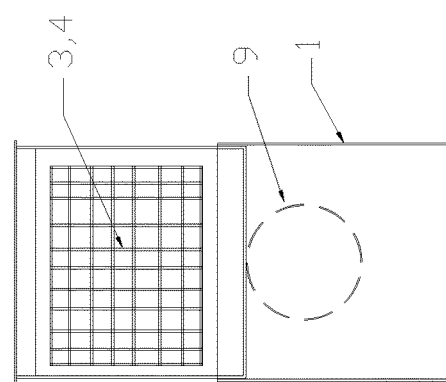
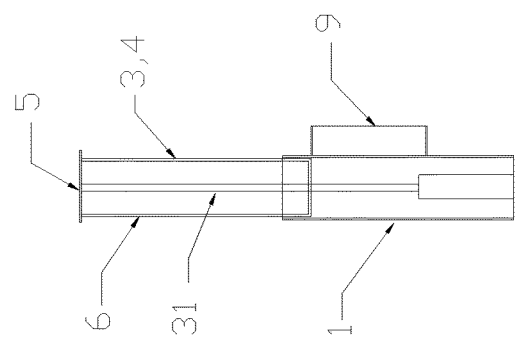
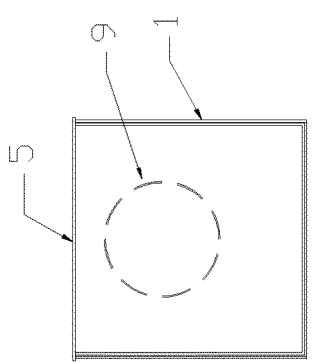
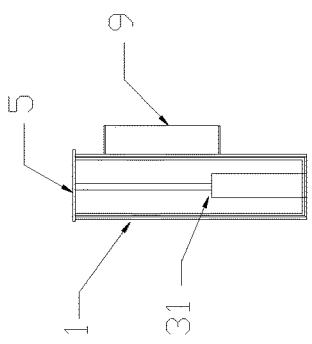

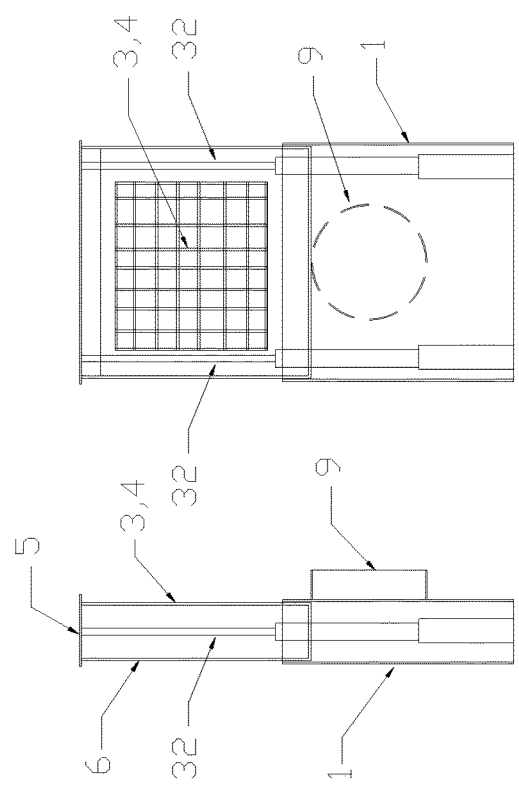
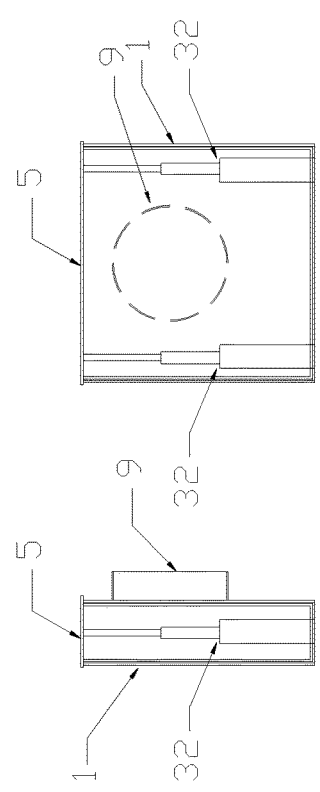

SOURCE CAPTURE APPARATUS FOR MANICURE TABLES

This application claims priority to a provisional application No. 62/670,152 filed on May 11, 2018 and which is incorporated herein in its entirety by reference.

COPYRIGHT NOTICE

A portion of the disclosure of this patent contains material that is subject to copyright protection. The copyright owner has no objection to the reproduction by anyone of the patent document or the patent disclosure as it appears in the Patent and Trademark Office patent files or records, but otherwise reserves all copyright rights whatsoever.

BACKGROUND OF THE INVENTION

1. Field of the Invention

The present invention relates to contaminated air extraction and air filtration. More particularly, it relates to extraction and filtration of contaminated air for manicure and pedicure tables.

2. Description of Related Art

Every day, nail technicians are exposed to a wide variety of hazardous chemicals, including acrylates and solvents. Commonly used nail products, like nail polish, polish removers and artificial nail products, contain a host of toxic chemicals known or suspected to cause cancer, reproductive harm, occupational asthma and other adverse health effects. Nail salon workers are particularly at risk for exposure, as they work with these products every day, often in poorly ventilated spaces. According to industry statistics, there are more than 200,000 nail salons with more than 375,000 workers in United States alone. Resulting from a number of studies Table 1, in Appendix 1, lists of some of the chemicals that are regularly present in nail salons.

Particularly troubling, many studies have concluded that exposure to, and inhalation of, these chemical vapors and fine dust result in adverse health effect. A study was conducted in Salt Lake County, Utah, in which VOC samples were collected in 12 randomly selected nail salons using summa air canisters and sorbent media for an 8-hr shift. Although methyl methacrylate has been banned for use in nail products by the State, it was found in 58% of the establishments. Similarly, formaldehyde levels were measured above the NIOSH REL (0.016 ppm) in 58% of salons.

Another study was conducted in 2 nail salons in Tampa, Fla. to assess personal exposure to ethyl methacrylate (EMA) and methyl methacrylate (MMA) among the fingernail sculptors. The 8-hr time weighted average (TWA) exposure for MMA has been below the OSHA PEL of 100 ppm. No OSHA PEL has been established for EMA. Despite the ban on the use of methyl methacrylate in Florida, personal exposure ranged between 1-5 ppm in these salons. The level of ethyl methacrylate was measured between 1-31 ppm.

An indoor air quality survey of nail salons in Boston indicated that CO2 levels in 15 of 21 salons exceeded 800 ppm, which is a surrogate for insufficient outdoor air ventilation. Also, the levels of VOCs and PM2.5 were found to be higher in salons with less outdoor air ventilation. A consistent trend in average exposures has been observed throughout the salons.

Personal sampling for VOCs (toluene, ethyl acetate, and isopropyl acetate) among 80 workers from 20 nail salons in California indicted exposures above the guidelines recommended by the California Division of Occupational Safety and Health to prevent health symptoms including headaches, irritation, and respiratory issues. Elevated concentrations of methyl methacrylate were found in the salons during area monitoring.

To control the exposure to these toxic chemicals and fine dust particles in the workplace, governmental agencies are increasingly advocating for and some mandating codes to improve ventilation in nail salons. At present, there are two types of ventilation methods and code that are encouraged and/or mandated by the government authorities and health departments.

The first is general exhaust, which aims to dilute the concentration of the chemicals and fine dust particles in the workplace. These systems introduce a relatively large amount of outside fresh air to the facility, while attempting to exhaust the same amount of air from the facility, thereby diluting the concentration of chemicals and fine dust particles within the indoor space.

The second method utilizes local exhaust systems that attempt to capture the high concentration of these chemicals and fine dust particles at their source, to remove them from the breathing zone of workers and clients.

There are currently two types of local exhaust systems that have been developed for, and are in use in, the nail salon industry. The first is a downdraft system, in which a port located on the surface of the manicure table is integrated with a ventilation system to pull contaminates down through the opening on the tabletop; thereby removing contaminates near the surface of the table and carrying them away from the breathing zone of the worker and client. Contaminated air is then either discharged from the facility, via an outlet duct and exhaust fan, or it is passed through a filtration system, to remove fine dust particles and chemicals and filtered air is recycled back into the space.

The second type of local exhaust systems are stand alone systems that utilize a collection hood, which is connected to an extraction hose, that is positioned in close proximity to the work area to capture contaminates by means of a suction fan. Again, the contaminated air is then either discharged from the facility or it is passed through a filtration system and reintroduced into the space. Table 2, in Appendix, summarizes the prior art.

The organization of ICC has come up with a set of ventilation recommendations for the nail salons. These are revised every three years and the most recent recommendation are outlined in Table 3.

TABLE 3

| | | PEOPLE OUTDOOR AIRFLOW RATE IN BREATHING ZONE | AREA OUTDOOR AIRFLOW RATE IN BREATHING ZONE | EXHAUST AIRFLOW RATE CFM/FT2 |
|---|---|---|---|---|
| OCCUPANCY CLASSIFICATION | OCCUPANCY #/1000 FT2 | | | |
| Nail Salons[b,h] | 25 | 20 | 0.12 | 0.6 |

[b]Mechanical exhaust required and the recirculation of air from such spaces is prohibited. Recirculation of air that is contained completely within such spaces shall not be prohibited.
[h]For nail salons, each manicure and pedicure station shall be provided with a source capture system capable of exhausting not less than 50 cfm per station. Exhaust inlets shall be located in accordance with Section 502.2. Where one or more required source capture system operates continuously during occupancy, the exhaust rate from such systems shall be permitted to be applied to the exhaust flow rate required by Table 403.3.1.1 for the nail salon.
Section 502.20 Manicure and pedicure stations. Manicure and pedicure stations shall be provided with an exhaust system in accordance with Table 403.3.1.1h. Manicure tables and pedicure stations not provided with factory-installed exhaust inlets shall be provided with exhaust inlets located not more than 12 inches (305 mm) horizontally and vertically from the point of chemical application.

Many states are now follow the IMC guideline and require nail salons to comply with ventilation protocols. Local exhaust systems, of the type previously described, attempt to satisfy this code by either utilizing a downdraft port, located on the manicure table, or by utilizing an extraction hood and hose unit to evacuate the required amount of air from the work area.

The problem with locating downdraft ports on the manicure table is that most manicurist place a towel down on the table and prefer to do their work on the towel. Additionally, these technicians tend to place other instruments in the center of the table where they perform the work. Given the usual placement of the towel and instruments, the downdraft port inevitably gets blocked resulting essentially in no suction at the port, meaning the contaminants are often not removed from the breathing zone.

The second type of the local exhaust systems that utilize an extraction hose with a hood positioned on the table near the work area function well, however these systems are not aesthetically pleasing and negatively impact the appearance of the salon. In addition, they are very costly. Furthermore, the visibility of these systems may create a fear factor among the workers and the clients and inadvertently affect the soothing ambiance that architects and salon owners are trying to create.

BRIEF SUMMARY OF THE INVENTION

The present invention relates to an apparatus for effective extraction and removal of toxic chemicals and fine dust particles from the breathing zone of workers and clients at active nail stations. According to this invention a source capture device integrated into a manicure station, or pedicure station, is employed, where the device is installed into a slot opening made in the manicure table, or the pedicure bench, and located approximately 6"-12" from the center, on either the right or left side, of the work area. The source capture device can be similarly used in a host of other applications to extract fine dust and hazardous chemicals from the source and away from the breathing zone to protect people in the immediate vicinity. However, the focus of this description will remain on the application of this type of source capture device for use in manicure and pedicure processes.

Accordingly, in one embodiment, there is a source capture device for installation on a table top consisting of a movable box and a fixed box, where the movable box can slide up and down inside the fixed box and the movable box has three sides and top closed, while one face side and the bottom is open, and the fixed box top is open to allow the placement of the movable box in the fixed box, and the fixed box has an outlet opening to connect an air duct which is then connected to a suction fan to withdraw air from the opening face of the movable box when the movable box is extended out of the fixed box, and then through the bottom opening of the movable box and into the fixed box and then out of the outlet opening, then through the connecting air duct and then into the suction fan and then discharge the air either inside or outside the room wherein the fixed box is to be installed on a table top in a manner to allow the top of the movable box to be flush with the table top in the closed position, and then allow the movable top to slide out of the fixed box vertically into the raised position.

BRIEF DESCRIPTION OF THE DRAWINGS

FIGS. 1a and 1b show elevation views of the source capture device.

FIGS. 1c and 1d depict the device in the active-state open position.

FIGS. 6a and 6b depict a manicure table equipped with the source capture device.

FIG. 7 depicts the connection of the source capture device to an exhaust fan via a connection duct.

FIG. 8 depicts the integration of the source capture device with an air purifier.

FIGS. 8a, 8b and 8c depict the integration of the source capture device with a novel inline fan/filter air purifier mounted on the side of the manicure table.

FIGS. 8d, 8e, 8f, 8g, 8h, 8i, 8j, 8k and 8l depict the novel fan/filter air purifier device.

FIG. 10 depicts a multi-station manicure table with two source capture devices showing the air purifier positioned in the middle of the table between the two source capture devices.

FIG. 11 depicts a dual-station manicure table with a dual-source capture device, once source capture device is shown in the active-state open position and the other device is shown in the inactive-state closed position.

FIG. 12 depicts a dual-station manicure table with a dual-source capture device, both source capture devices are shown in the active-state open position.

FIG. 19a depicts a pedicure bench with a pedicure chair equipped with the source capture device, the device in the active-state open position.

FIG. 19b depicts a pedicure bench with a pedicure chair equipped with the source capture device, the device in the inactive-state closed position.

FIG. 20a depicts a pedicure bench with a pedicure chair equipped with the source capture device integrated with an air purifier that recycles treated air back into the salon.

FIG. 20b depicts a pedicure bench with a pedicure chair equipped with the source capture device integrated with an air purifier that exhausts treated air outdoors via the exhaust duct.

FIGS. 21a and 21b show the plan and elevation views of the source capture device with a gas cylinder actuator, the device is shown in the inactive-state closed position.

FIGS. 21c and 21d show the plan and elevation views of the source capture device with a gas cylinder actuator, the device is shown in the active-state open position.

FIGS. 22a and 22b show the plan and elevation views of the source capture device with an electric actuator, the device is shown in the inactive-state closed position.

FIGS. 22c and 22d show the plan and elevation views of the source capture device with an electric actuator, the device is shown in the active-state open position.

FIGS. 23a and 23b show elevation views of the source capture device with two telescopic support arms, the device in the inactive-state closed position.

FIGS. 23c and 23d show elevation views of the source capture device with two telescopic support arms, the device in the active-state open position.

DETAILED DESCRIPTION OF THE INVENTION

Figure 2C:
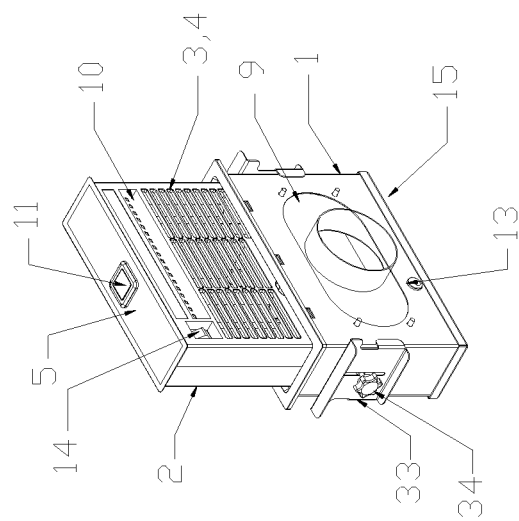
FIGS. 2b and 2c depict the source capture device in the active-state open position.

While this invention is susceptible to embodiment in many different forms, there is shown in the drawings, and will herein be described in detail, specific embodiments with the understanding that the present disclosure of such embodiments is to be considered as an example of the principles and not intended to limit the invention to the specific embodiments shown and described. In the description below, like reference numerals are used to describe the same, similar, or corresponding parts in the several views of the drawings. This detailed description defines the meaning of the terms used herein and specifically describes embodiments in order for those skilled in the art to practice the invention.

Definitions

The terms "about" and "essentially" mean±10 percent.

The terms "a" or "an", as used herein, are defined as one or as more than one. The term "plurality", as used herein, is defined as two or as more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically.

The term "comprising" is not intended to limit inventions to only claiming the present invention with such comprising language. Any invention using the term comprising could be separated into one or more claims using "consisting" or "consisting of" claim language and is so intended.

Reference throughout this document to "one embodiment", "certain embodiments", "an embodiment", or similar terms means that a particular feature, structure, or characteristic described in connection with the embodiment is included in at least one embodiment of the present invention. Thus, the appearances of such phrases in various places throughout this specification are not necessarily all referring to the same embodiment. Furthermore, the particular features, structures, or characteristics may be combined in any suitable manner in one or more embodiments without limitation.

The term "or", as used herein, is to be interpreted as an inclusive or meaning any one or any combination. Therefore, "A, B, or C" means any of the following: "A; B; C; A and B; A and C; B and C; A, B, and C". An exception to this definition will occur only when a combination of elements, functions, steps, or acts are in some way inherently mutually exclusive.

The drawings featured in the figures are for the purpose of illustrating certain convenient embodiments of the present invention, and are not to be considered as limitation thereto. The term "means" preceding a present participle of an operation indicates a desired function for which there is one or more embodiments, i.e., one or more methods, devices, or apparatuses for achieving the desired function and that one skilled in the art could select from these or their equivalent in view of the disclosure herein, and use of the term "means" is not intended to be limiting.

As used herein, the term "source capture device" refers to a device that extracts the contaminated air at the point of generation.

As used herein, the term "manicure" refers to a cosmetic treatment of the hands involving cutting, shaping, and often painting of the nails, removal of the cuticles, and softening of the skin.

As used herein, the term "pedicure" refers to a cosmetic treatment of the feet and toenails.

As used herein, the term "local exhaust system" refers to an engineering control system to reduce exposures to airborne contaminants such as dust, mist, fume, vapor or gas in the workplace.

As used herein, the term "breathing zone" refers to the area closest to an employee's mouth and nostrils in a workplace. The U.S. Occupational Safety and Hazard Administration (OSHA) defines the breathing zone as the area within a ten-inch radius of the worker's face.

As used herein, the term "ICC" refers to the International Code Council.

As used herein, the term "IMC" refers to the International Mechanical Code.

As used herein, the term "downdraft system" refers to a type of ventilation that pulls the contaminated air that has dust and chemical fumes downward through an opening in the table.

As used herein, the term "VOC" refers to Volatile Organic Compound in the air that is hazardous if inhaled.

As used herein, the term "toxic chemical" refers to any substance which may be harmful to the environment or hazardous to your health if inhaled, ingested or absorbed through the skin as defined by the U.S. Environmental Protection Agency or EPA.

As used herein, the term "fine dust" refers to particles people further from the source are often exposed to. These particles are nearly invisible, fine dust particles that people can unknowingly inhale deep into their lungs—as coarse dust is too big to be deeply inhaled. After inhalation, it can cause long term scarring of lung tissue as well as induce cancer and lung disease.

The present invention solves the problems associated with both types of local exhaust systems, namely by addressing the functional ineffectiveness of downdraft ports and the unsightly appearance of extraction hose apparatus. The preset invention accomplishes this by utilizing a source capture device that is flush mounted in the table, on either the right or left side of the work space, at a distance of 6" to 12" from the center of the work area. Perpendicular to the table, the face of the source capture device allows for unrestricted flow into the inlet. Additionally, the mechanics of the source capture device enable it to be easily pulled up and locked into place, by the worker, to extract chemical vapors and fine dust particles, while work is in progress. Conversely, when not in use, the source capture device can be lowered such that it is concealed from view.

Beneath the surface of the table, the outlet of the source capture device is connected to a port on the side of the manicure table via a duct, e.g. a round, oval or rectangular duct or the like. This duct can then either be connected to an exhaust ducting system that is equipped with an exhaust fan to withdraw the contaminate and discharge it outdoors, or connected to a filtration system that removes the contaminate from the air and recycles the treated air back into the salon.

The same source capture device can be used for the pedicure stations. For this application, the device is mounted on the pedicure bench adjacent to the sink, where pedicure work is typically done. Ducting connects the outlet port of the device to the exhaust equipment, which withdraws the contaminated air and carries it through the system. The contaminated air is either directly exhaust outdoors or passed through a filter system to remove the contaminate from the air. In the case that the air is filtered, treated air is then recycled back into the salon or exhaust to the outside. When not in use, the source capture device can be configured in the inactive-state closed position to be concealed from view.

A notable quality of this invention is that it will automatically block the air passage when lowered into the housing, thereby restricting any airflow when it is not needed. In a salon with multiple tables that are equipped with this device, and connected to a common duct and exhaust fan system, the automatic closure of air passages of devices that are not is use will reduce the exhausted air, or the need to filter that air, saving energy and reducing any noise from the unused devices.

Another significant quality of this invention is the superior fume capture capability that results from the perpendicular arrangement of the extraction port. As compared to a downdraft system that locates an extraction port on the surface of the table at the same distance from the work area, the source capture device demonstrates greater effectiveness. FIG. 18 shows a comparison of the air capture velocity between this source capture device and a downdraft slot opening on the surface of the table about 10" from the center of the work area. Both the source capture device and the slot opening, which have the same cross-sectional dimensions of 2"×8", are connected to an exhaust fan capable of exhausting the required 50 cfm. The plan and elevation view of the capture velocity curve at 50 fpm is shown for both cases. Note that, the circle at the center of the table represents the area where a manicurist works, which is therefore the source of the toxic chemicals. To effectively capture and remove these chemicals from the breathing zone of the worker and the client, a capture velocity greater than 50 fpm is required. For both cases, the air volume on the left side of the heavy line is the effective space that is being extracted from the breathing zone and moved out toward the exhaust hood to be removed. As indicated, the source capture device positioned 90° relative to the table top effectively provides capture velocities over the 50 fpm over the entire work space, while the downdraft slot does not produce considerable capture velocity beyond a few inches from the slot.

Another feature of this invention lies in the internal design, which forces the flow stream to make a sharp 90° turn into the outlet port. As a result of this design feature, the centrifugal force, due to the mass of the nail dust particles, will force the larger nail dust particles to drop toward the bottom of the stationary housing, where they naturally accumulate until emptied. Given this dynamic, the source capture device will act as a dust collector for nail dust particles, thereby separating much of the nail dust from contaminated air and preventing most of it from entering the outlet ducting.

The source capture device presented herein can be utilized for other applications, where it similarly functions to extract harmful dust and chemical fumes from the work area and away from the breathing zone of operators and technicians. For example, the same source capture device can be used for soldering work, laser fume extraction from laser marker, cutting or engraving work, welding fume extraction, dental lab dust collection, solvent fume extraction in laboratories, and a host of other cases where hazardous dust and fumes need to be extracted and removed from the breathing zone to protect the health of the operators and technicians.

The source capture device includes a stationary housing component, which is flush mounted on the manicure table, and a movable box component, that is concealed from view when lowered into the stationary housing. When required for use, the movable box is engaged by the worker, raised and locked into position. This movement can be controlled manually by grabbing a handle and pulling the movable box upward, or automatically by using a pneumatic cylinder or an electrically operated linear actuator.

The movable box is rectangular and has an inlet opening on one side. The opening, on which a vent grille can be installed, faces towards the work area. A light source, such as an LED type, can be installed on the top section of the movable box. The worker can turn the light on and off by means of an On/Off switch. The light source will illuminate the work area of the manicure table, or pedicure bench, and assist the manicurist while work is in progress.

The bottom side of the movable box is open to allow contaminated air to pass through the component and into the stationary housing. The bottom side of the stationary housing is designed with a removable panel, which is attached by means of a clip-in or hinged mechanism or stay in place by means of magnets. When the removable panel is open, nail dust particles that have accumulated in the stationary housing, during the collection process, can be periodically removed. After the nail dust particles are dump or vacuumed out, and the stationary housing is emptied, the removable panel is closed and the system is ready for operation.

The stationary housing has two outlet ports, one on the front side of the component and one on the back side of the component. The outlet ports enable connection of the source capture device to connection ducting and exhaust ducting. For systems in which one source capture device is independently employed, only one outlet port is required to be open and the unused outlet port can be closed with a cover plate. For systems in which multiple devices are interconnected both outlet ports may be required to be open on the respective devices and the cover plates can be removed.

A connection duct can be used to connect the outlet of the source capture device to the inlet of an exhaust fan. The exhaust fan is utilized to draw contaminated air through the system; with the unidirectional flow of air moving from the work zone, through the inlet vent grille and the movable box, down through the stationary housing and the outlet port, and through the connection ducting and fan.

Ideally, an air purifier can be utilized, prior to the exhaust fan, to filter fine dust particles and toxic chemicals. The filtered air can then either be discharged outdoor or recycled into the salon. It is possible to eliminate the filtration system and directly exhaust the contaminated air outdoor, however, in one embodiment, it can use a dust filter prior to the exhaust fan to reduce particulate build up in the exhaust ducting and fan.

The air purifier can be a free-standing unit with a filter compartment and an exhaust fan compartment, or it can be an inline filter/fan device with is mounted on the side of the manicure table and is connected to the source capture device by means of a connection duct within the manicure table.

Ideally, the filter/fan device incorporates a novel air filter made of pleated electret filter media which enhances the dust capture efficiency at a lower pressure drop and achieved higher dust loading capacity.

This novel air filter could also include a layer of adsorbent fibrous filter or adsorbent granular particles to adsorb the toxic chemical and odor.

The capacity of the exhaust fan is such that it provides adequate airflow suction at the face of the inlet vent grille mounted on the movable box. A minimum of 50 cfm of extraction capacity is recommended per the IMC code. The source capture device is designed to produce high capture velocity of fine dust particles and fumes in the proximity of the work area. The source capture device is installed about 6"-12" from the center of the work area, to allow ample space for the manicurist to work without obstruction or interference from the device.

When in use, the source capture device will create a cross flow air pattern to draw fine dust particles and toxic chemicals away from the work area, where the manicurist works on the clients' hand, and into the inlet vent grille of the movable box. The surface area of the face with the inlet grill vent is approximately 8"×4", given that the device has a maximum height of 5" to 6", above the tabletop, when fully pulled up. Of that area, the inlet vent grille comprises approximately 60% of. The inlet vent grille consists of mostly open space, therefore the suction action at its face creates sufficient capture velocity to effectively extract contaminated air from the work area and toward the inlet vent grille.

Most nail salons utilize several manicure stations and several pedicure stations to accommodate a number of clients simultaneously. Each manicure table and pedicure bench can be equipped with a source capture device, and either one exhaust fan or multiple exhaust fans can be employed to connect to the source capture devices and provide adequate air suction for each respective device. As previously described, the exhaust fans can be equipped with air purifiers, to enable treated air to be recycled back into the salon or be vented outdoors.

When one or more nail stations is inactive, the movable box of the source capture device can be lowered into the stationary housing, such that the top of the device is flush with the top of the manicure table to conceal the device from the view. This capability creates harmony between the device and aesthetics of the nail salon. In addition, pushing the movable box down into the stationary housing will block the exhaust port and cut off the flow of the air through the device. This inactive state positioning will reduce the load on the exhaust fan, which will reduce the power consumption of the exhaust fan, thus saving energy and providing an energy efficient system.

DRAWINGS

Now referring to the drawings, FIGS. 1a and 1b show elevation views of the source capture device in the inactive-state closed position, while FIGS. 1c and 1d depict the device in the active-state open position. The source capture device is comprised of a stationary housing 1 component and a movable box 2 component. One face of the movable box has an inlet port 3 opening with a vent grill 4 mounted on it. The top panel 5 and the back panel 6 of the movable box component are closed surfaces, while the bottom section 7 is open to enable the downward flow of air into the stationary housing component. A slanted baffle plate 8, within the movable box, directs airflow toward the bottom section. An outlet port 9 is located on the front and the back side of the stationary housing component. The outlet ports serve as connection points between the stationary housing and ducting. Depending on the ducting arrangement, either one or both outlet ports is utilized. When no work is being done at the manicure station, and the source capture device is not needed, the movable box can be pushed down and lowered into the stationary housing. In this inactive-state closed position the movable box is concealed from view and the top panel is flush with the tabletop, thus providing a pleasant unobstructed view of the manicure table.

Figure 2B:
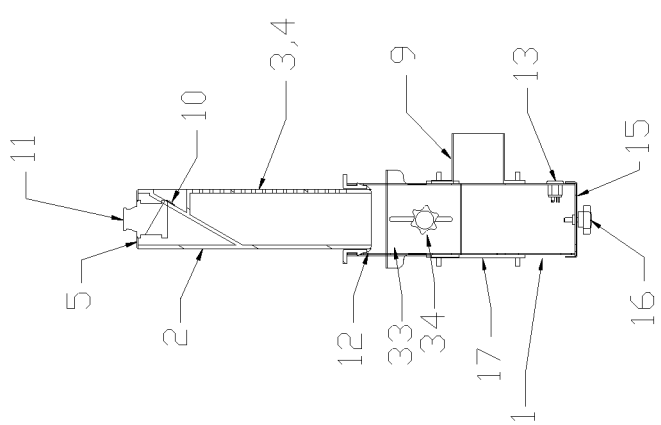
Figure 2A:
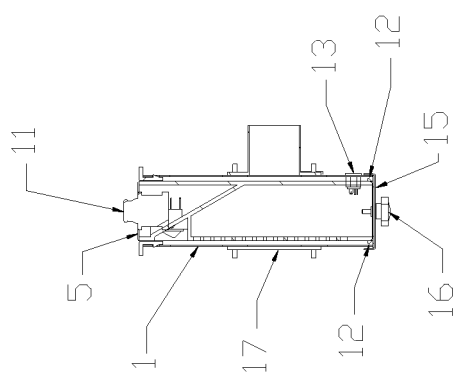
FIG. 2a depicts the source capture device in inactive-state closed position.

FIG. 2a depicts the source capture device in the inactive-state closed position and the active-state open position shown in FIGS. 2b and 2c. The device has a row of LED lights 10, installed on the top section of the moveable box 2, which are used to illuminate the work space at the manicure station. The frame on which the LED lights are installed has a slope of about 20-30°. A spring-loaded knob 11 is located on the top panel 5. When required, the spring-loaded knob is used to manually pull the movable box up and into the active-state position. The movable box has two stop-clips 12 that prevent it from disengaging from the stationary housing component 1. A power socket 13 is located on the bottom of the stationary housing component and it is connected to the LED light via electrical wires. A DC power source is plugged into the power socket, and an On/Off switch 14 is provided to enable the LED lights to be turned on and off. The bottom of the stationary housing component has a removable panel 15 that can be opened in order to empty nail dust that accumulates within the source capture device during the collection process. A turn knob 16 can be utilized to secure the removable panel to the stationary housing component, and also enable it to open and close when required. Outlet ports 9 are provided on the front and back side of the stationary housing 1. A cover plate 17 can be used to seal one of the outlet ports, so that the air can only exit the stationary housing component from the open outlet port. Mounting brackets 33 with the thumb screws 34 are used to mount the source capture device onto the manicure table, though any attachment device can be utilized.

Figure 3:
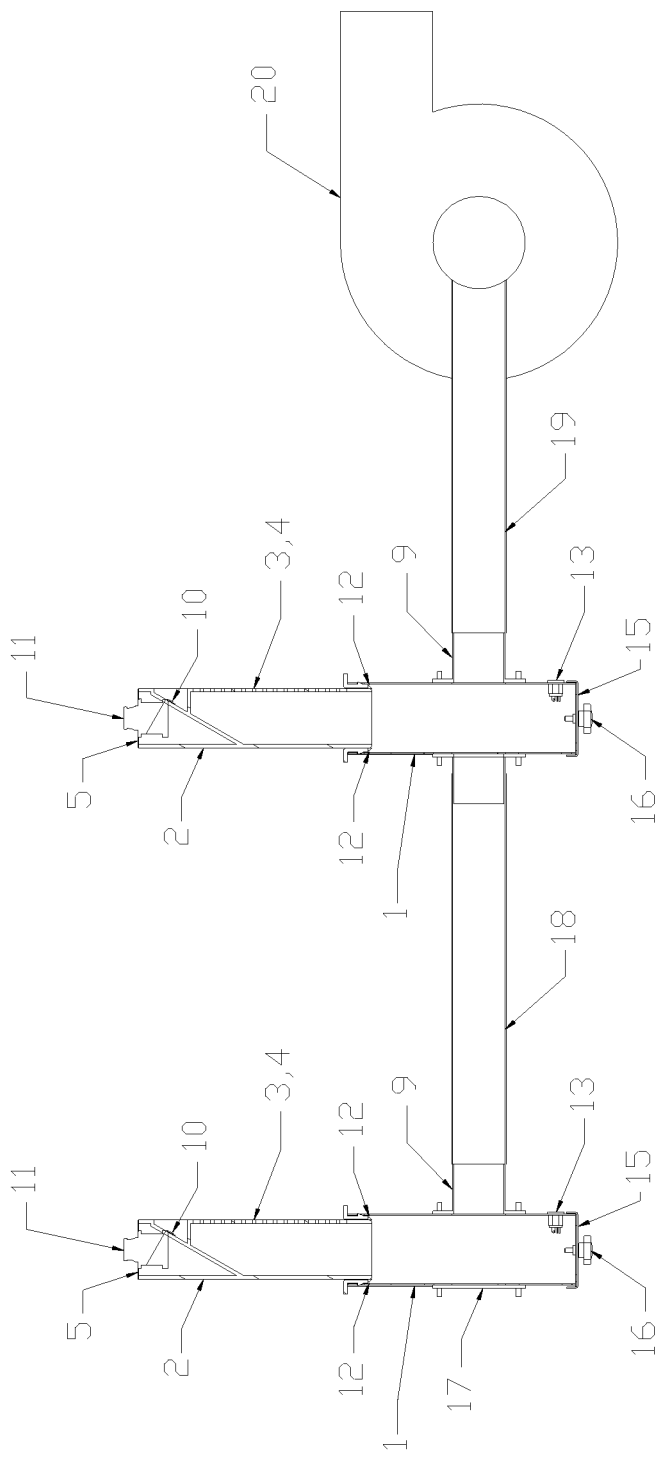
FIG. 3 depicts a multi-source capture device arrangement, where multiple source capture devices are used in series to serve multiple manicure stations.

FIG. 3 depicts a multi-source capture device arrangement, where multiple source capture devices are used in series to serve multiple manicure stations. In this case, two or more source capture devices are interconnected by means of a connection duct 18 and an exhaust duct 19 connects the outlet port of one device to a common exhaust fan 20.

Figure 4:
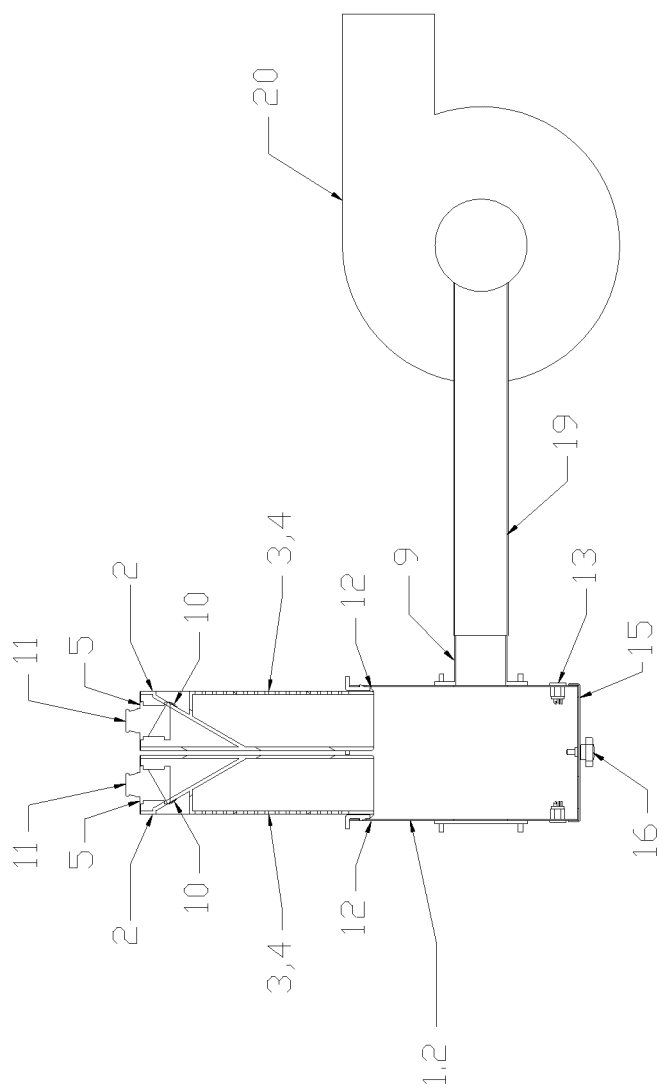
FIG. 4 depicts a dual-source capture device, in which the common stationary housing accommodates two source capture devices.

FIG. 4 depicts a dual-source capture device, in which the common stationary housing 1.2 accommodates two source capture devices. The source capture devices are installed such that the respective inlet ports 3 point in opposite directions. In this case, two manicure stations can be served by a single dual-device. An exhaust duct 19 connects the outlet port 9 of the dual-device to a common exhaust fan 20.

Figure 5C:
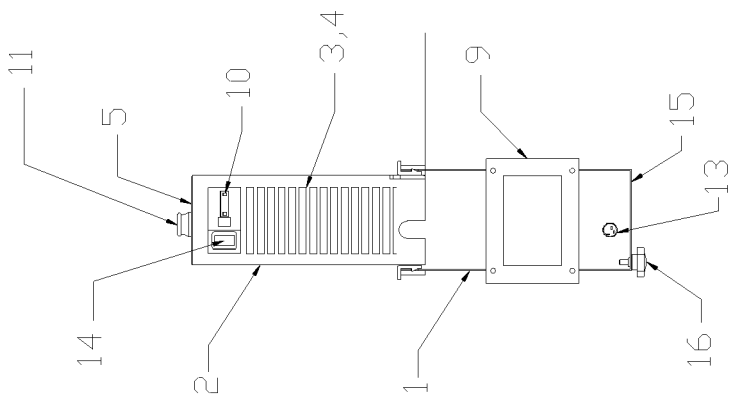
FIGS. 5a, 5b and 5c depict the source capture device designed for use in a typical pedicure bench.
Figure 5B:
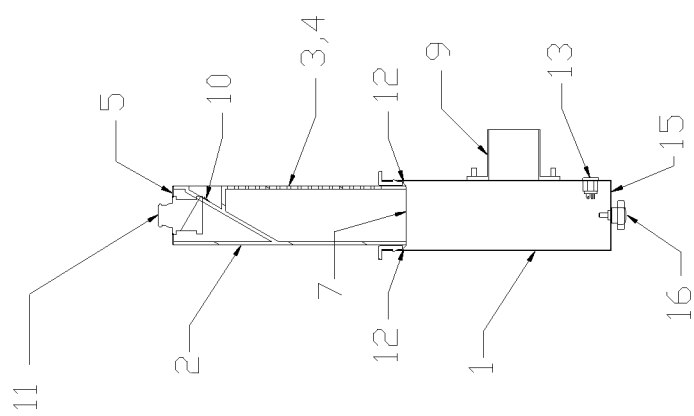
Figure 5A:
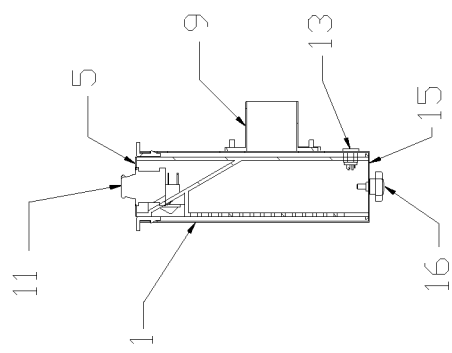

FIGS. 5a, 5b and 5c depict the source capture device designed for use in a typical pedicure bench. The device is made narrower to fit in the space adjacent to the sink in the pedicure chair. The height of the device could be made taller to enable the source capture device to effectively extract the contaminated air around the pedicure work area. FIG. 5a shows the device in the inactive-state closed position, while FIGS. 5b and 5c show the device in the active-state open position.

FIGS. 6a and 6b depict a manicure table 21 equipped with the source capture device, where the connection duct 18 connects the outlet port 9 of the device to the exhaust system. FIG. 6a shows the device in the active-state open position, while FIG. 6b shows the device in the inactive-state closed position with the top panel 5 flush with the top of the manicure table. The arrows in the diagram show the directional flow of air from the work area and through the system.

FIG. 7 depicts the connection of the source capture device to an exhaust fan 20 via a connection duct 18. The arrows in the diagram show the directional flow of air from the work area and through the system. As shown, air passes through the exhaust fan, and is then vented out of the facility via an exhaust duct 19 that passes through the exterior wall 22 of the salon.

FIG. 8 depicts the integration of the source capture device with an air purifier 23. As shown, the outlet port 9 of the source capture device is connected to the inlet of the air purifier via a connection duct 18. The arrows in the diagram show the directional flow of air from the work area and through the system. Contaminated air is drawn through the source capture device and into the air purifier, where it is filtered. Once treated, clean air is ultimately recycled back into the salon.

FIGS. 8a, 8b and 8c depict the integration of the source capture device with a novel inline fan/filter air purifier 23A mounted on the side of the manicure table. As shown, the outlet port 9 of the source capture device is connected to the inlet of the fan/filter air purifier 23A via a connection duct 18. The arrows in the diagram show the directional flow of air from the work area and through the system. Contaminated air is drawn through the source capture device and into the fan/filter air purifier 23A, where it is filtered. Once treated, clean air is ultimately recycled back into the salon.

FIGS. 8d, 8e, 8f, 8g, 8h, 8i, 8j, 8k and 8l depict the novel fan/filter air purifier device 23A. The fan/filter air purifier device 23A is comprised of a housing 39A, with air inlet tube 39 and air outlet grill 40. The housing has two compartments, the air filter compartment 39B and fan compartment 39C. A specially designed dust and toxic chemical filter designated as eHEPA filter 42 is placed into the air filter compartment 39B and two small centrifugal fans 41 are mounted in the fan compartment 39C. These centrifugal fans provide about 50 cfm of air flow through the inlet 39 and across the air filter 39B where the contaminated air is filtered and then the clean air is discharged through the discharge grill 40.

Figure 8M:
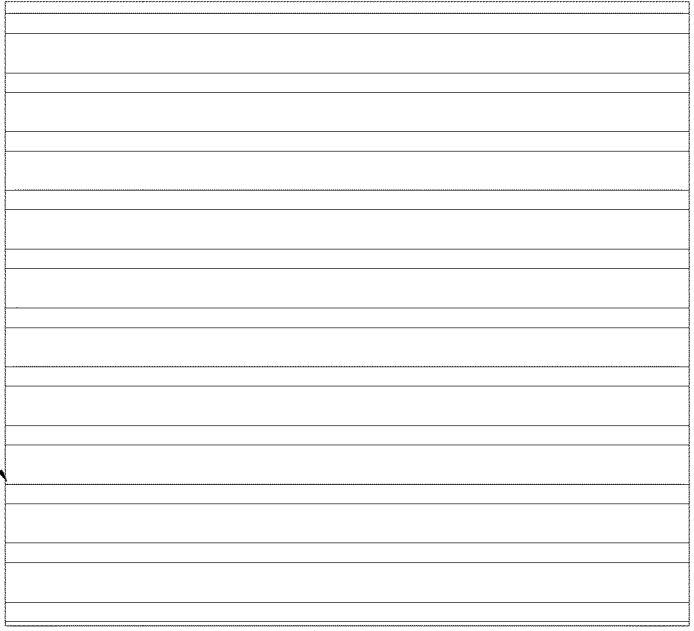
FIG. 8m depicts the top view of the construction of the eHEPA filter.
Figure 8N:
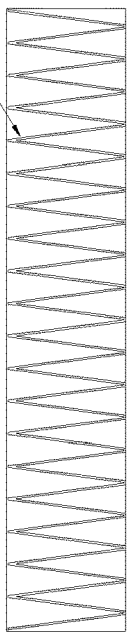
FIG. 8n shows a cross section view of single layer electrostatically charged media filter.
Figure 8O:
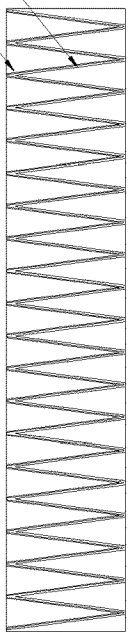
FIG. 8o shows a cross sectional view of multi layer electrostatically charged media filter with a second layer of adsorbent media filter
Figure 8P:
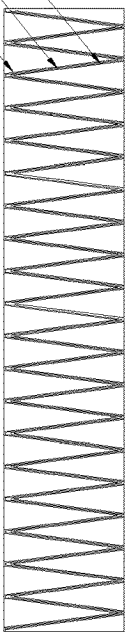
FIG. 8p shows a cross sectional view of multi layer electrostatically charged media filters with adsorbent granules sandwiched in between FIG. 9 depicts a multi-station manicure table with two source capture devices showing the air purifier positioned on the left side of the table.

FIG. 8m depicts the top view of the construction of the eHEPA 42 filter by pleating an electrostatically charged filter media either in a single layer 42A as shown in its cross section view on FIG. 8n or multiple layer assembly where the outer layer is of fibrous filter media 42A that is electrostatically charged filter media which is formed by fibers that carry electrostatic charge which is now widely used in such filters like those in respirator type air filters. The next layer is of adsorbent fibers 42B which is detailed on the cross sectional view in FIG. 8o, or adsorbent granular particles 43C such as activated carbon particles that are held between two layers of the electrostatically charged fibrous filter media 42A which is described in its cross sectional view in FIG. 8p. The eHEPA filter 40 thus will have a higher particle capture efficiency while having a lower pressure drop and more dust holding capacity, while also removing the odorous and toxic chemicals by adsorption onto the particles of activated carbon or other adsorbent fibers.

Figure 9:
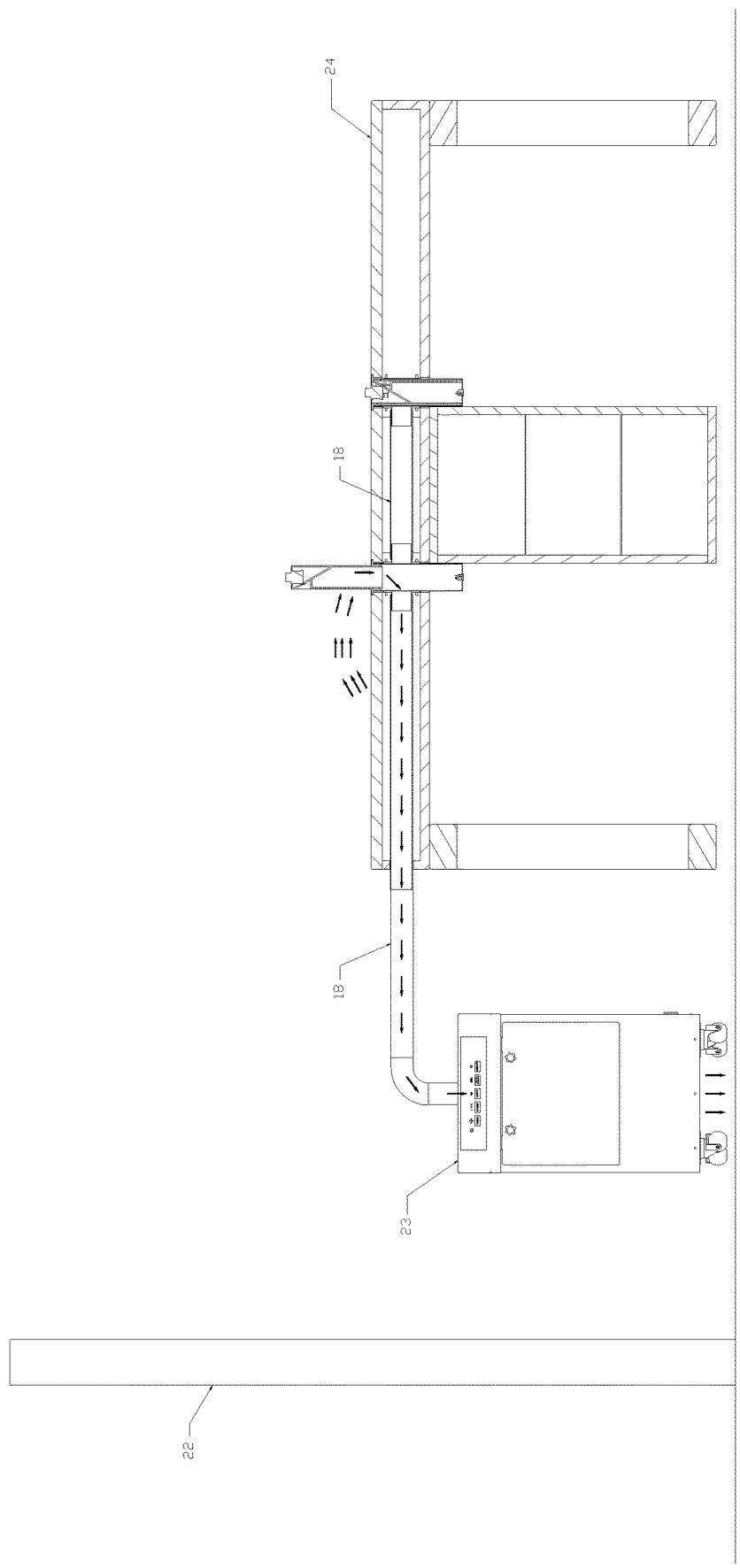

FIG. 9 depicts a multi-station manicure table 24 with two source capture devices, which are connected via a connection duct 18 and integrated with an air purifier 23. One source capture device is shown in the active-state open position and the other device is shown in the inactive-state closed position. The arrows in the diagram show the directional flow of air from the work area and through the system. Contaminated air withdrawn from the work area flows into the air purifier, which filters the air and ultimately recycles clean air back into the salon. FIG. 9 shows the air purifier positioned on the left side of the table.

FIG. 10 depicts a multi-station manicure table 24 with two source capture devices, which are connected via a connection duct 18 and integrated with an air purifier 23. One source capture device is shown in the active-state open position and the other device is shown in the inactive-state closed position. The arrows in the diagram show the directional flow of air from the work area and through the system. Contaminated air withdrawn from the work area flows into the air purifier, which filters the air and ultimately recycles clean air back into the salon. FIG. 10 shows the air purifier positioned in the middle of the table between the two source capture devices.

FIG. 11 depicts a dual-station manicure table 24 with a dual-source capture device 1.2, which is integrated with an air purifier 23 via a connection duct 18. One source capture device is shown in the active-state open position and the other device is shown in the inactive-state closed position. The arrows in the diagram show the directional flow of air from the work area and through the system. Contaminated air withdrawn from the work area flows into the air purifier, which filters the air and ultimately recycles clean air back into the salon.

FIG. 12 depicts a dual-station manicure table 24 with a dual-source capture device 1.2, which is integrated with an air purifier 23 via a connection duct 18. Both source capture devices are shown in the active-state open position. The arrows in the diagram show the directional flow of air from the work area and through the system. Contaminated air withdrawn from the work area flows into the air purifier, which filters the air and ultimately recycles clean air back into the salon.

Figure 12A:
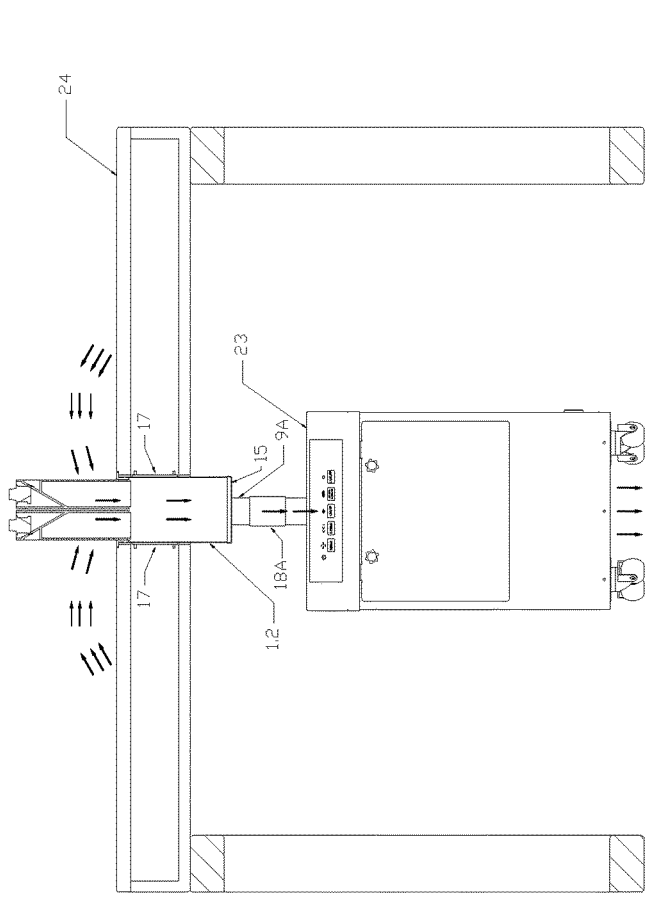
FIG. 12a depicts a dual-station manicure table with a dual source capture device with the exhaust port located on the bottom of the cover panel.

FIG. 12a depicts a dual-station manicure table 24 with a dual source capture device 1.2, with the exhaust port 9A located on the bottom of the cover panel 15. An air purifier 23 placed under it and connection duct 18. A cover plate 17 on either side can be used to seal the side outlet ports, so that the air can only exit the stationary housing component from the bottom outlet port. The arrows in the diagram show the directional flow of air from the work area and through the system. Contaminated air withdrawn from the work area flows into the air purifier, which filters the air and ultimately recycles clean air back into the salon.

Figure 12B:
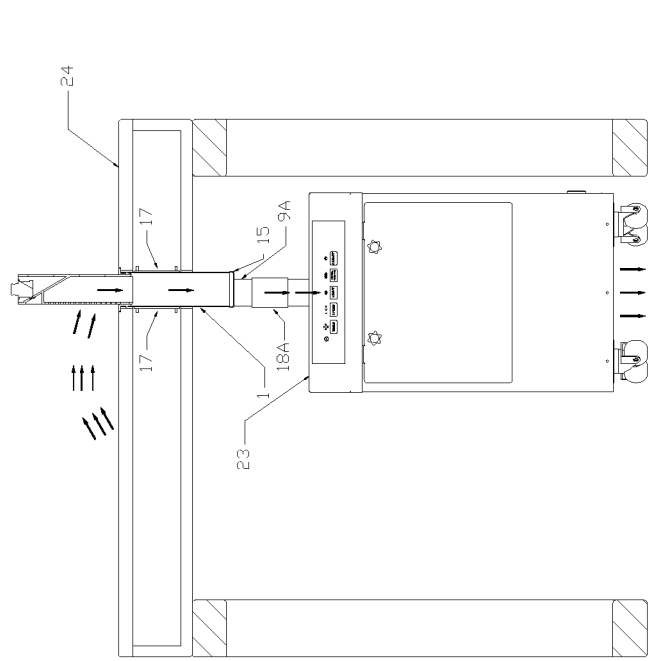
FIG. 12b depicts a single-station manicure table with a single source capture device with the exhaust port located on the bottom of the cover panel.

FIG. 12b depicts a single-station manicure table 24 with a single source capture device 1, with the exhaust port 9A located on the bottom of the cover panel 15. An air purifier 23 placed under it and connection duct 18. A cover plate 17 on either side can be used to seal the side outlet ports, so that the air can only exit the stationary housing component from the bottom outlet port. The arrows in the diagram show the directional flow of air from the work area and through the system. Contaminated air withdrawn from the work area flows into the air purifier, which filters the air and ultimately recycles clean air back into the salon.

Figure 13:
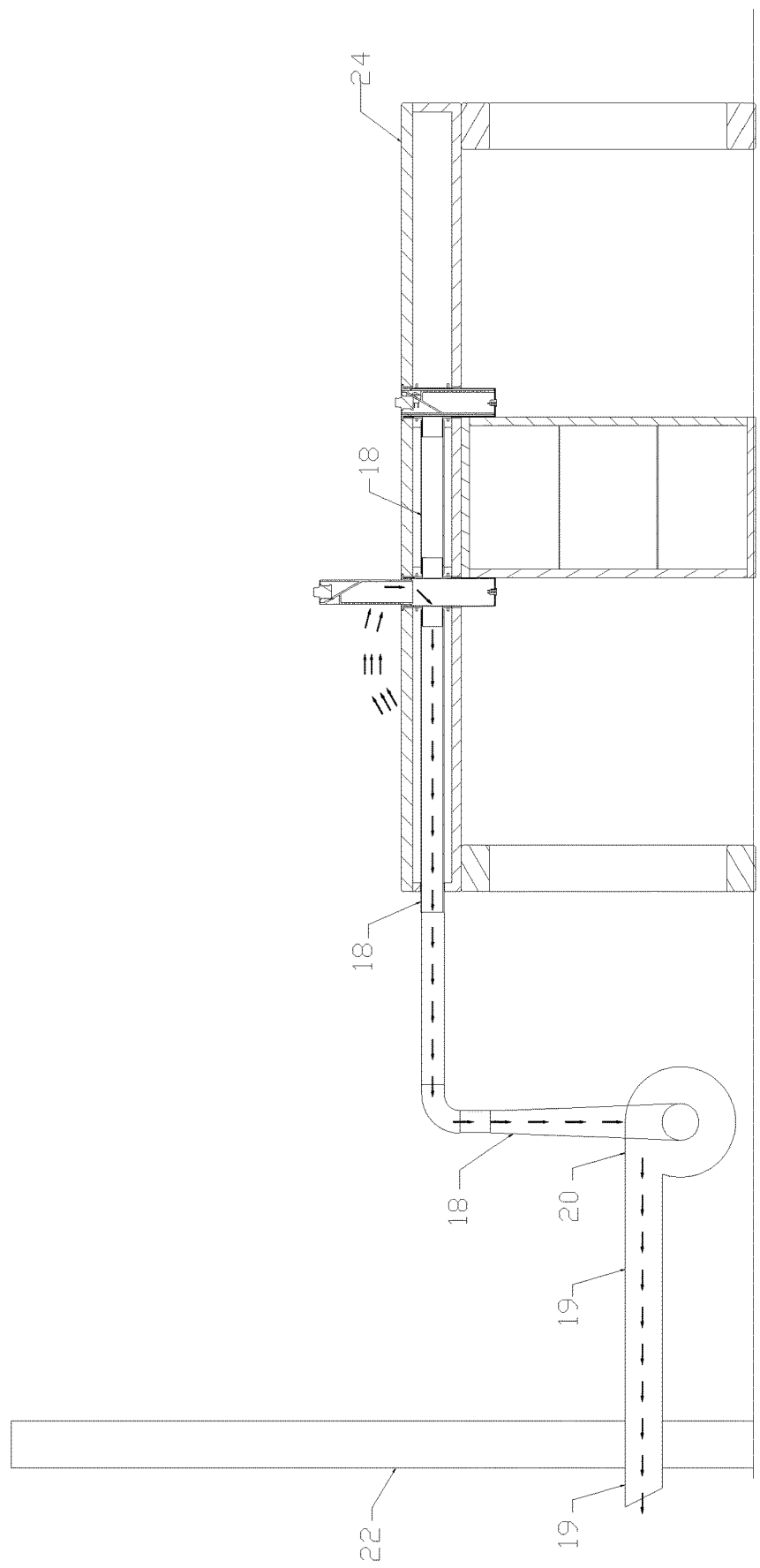
FIG. 13 depicts a multi-station manicure table with two source capture devices, one source capture device is shown in the active-state open position and the other device is shown in the inactive-state closed position.

FIG. 13 depicts a multi-station manicure table 24 with two source capture devices. The devices are connected via a connection duct 18 and integrated with an exhaust fan 20. One source capture device is shown in the active-state open position and the other device is shown in the inactive-state closed position. The arrows in the diagram show the directional flow of air from the work area and through the system. Contaminated air, withdrawn from the work area, flows through the exhaust fan and is ultimately vented out of the salon via exhaust duct 19.

Figure 14:
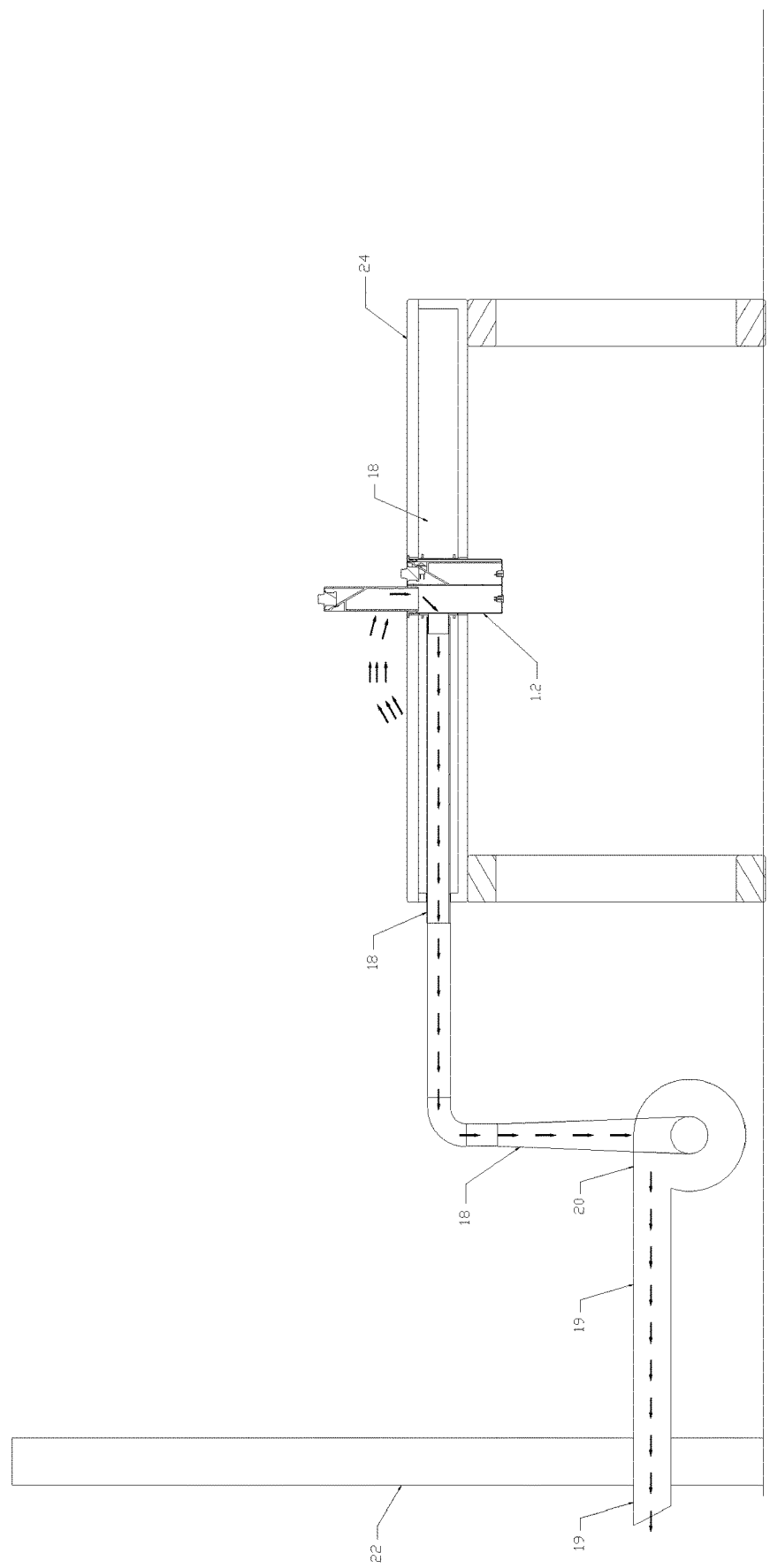
FIG. 14 depicts a dual-station manicure table with a dual-source capture device, one source capture device is shown in the active-state open position and the other device is shown in the inactive-state closed position.

FIG. 14 depicts a dual-station manicure table 24 with a dual-source capture device 1.2. The device is integrated with an exhaust fan 20 via a connect duct 18. One source capture device is shown in the active-state open position and the other device is shown in the inactive-state closed position. The arrows in the diagram show the directional flow of air from the work area and through the system. Contaminated air, withdrawn from the work area, flows through the exhaust fan and is ultimately vented out of the salon via an exhaust duct 19.

Figure 15:
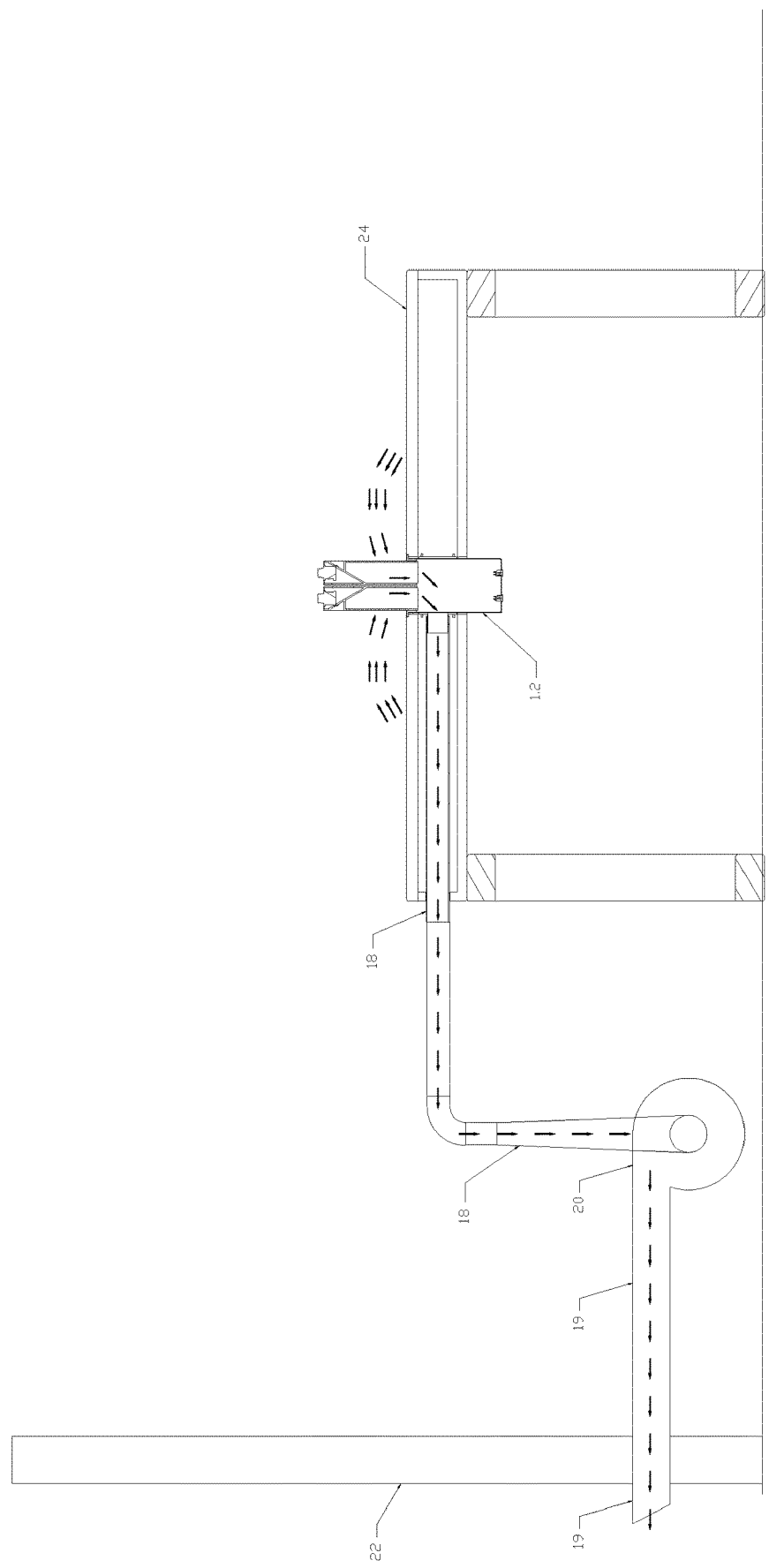
FIG. 15 depicts a dual-station manicure table with a dual-source capture device, both source capture devices are shown in the active-state open position.

FIG. 15 depicts a dual-station manicure table 24 with a dual-source capture device 1.2. The device is integrated with an exhaust fan 20 via a connect duct 18. Both source capture devices are shown in the active-state open position. The arrows in the diagram show the directional flow of air from the work area and through the system. Contaminated air, withdrawn from the work area, flows through the exhaust fan and is ultimately vented out of the salon via an exhaust duct 19.

Figure 16:
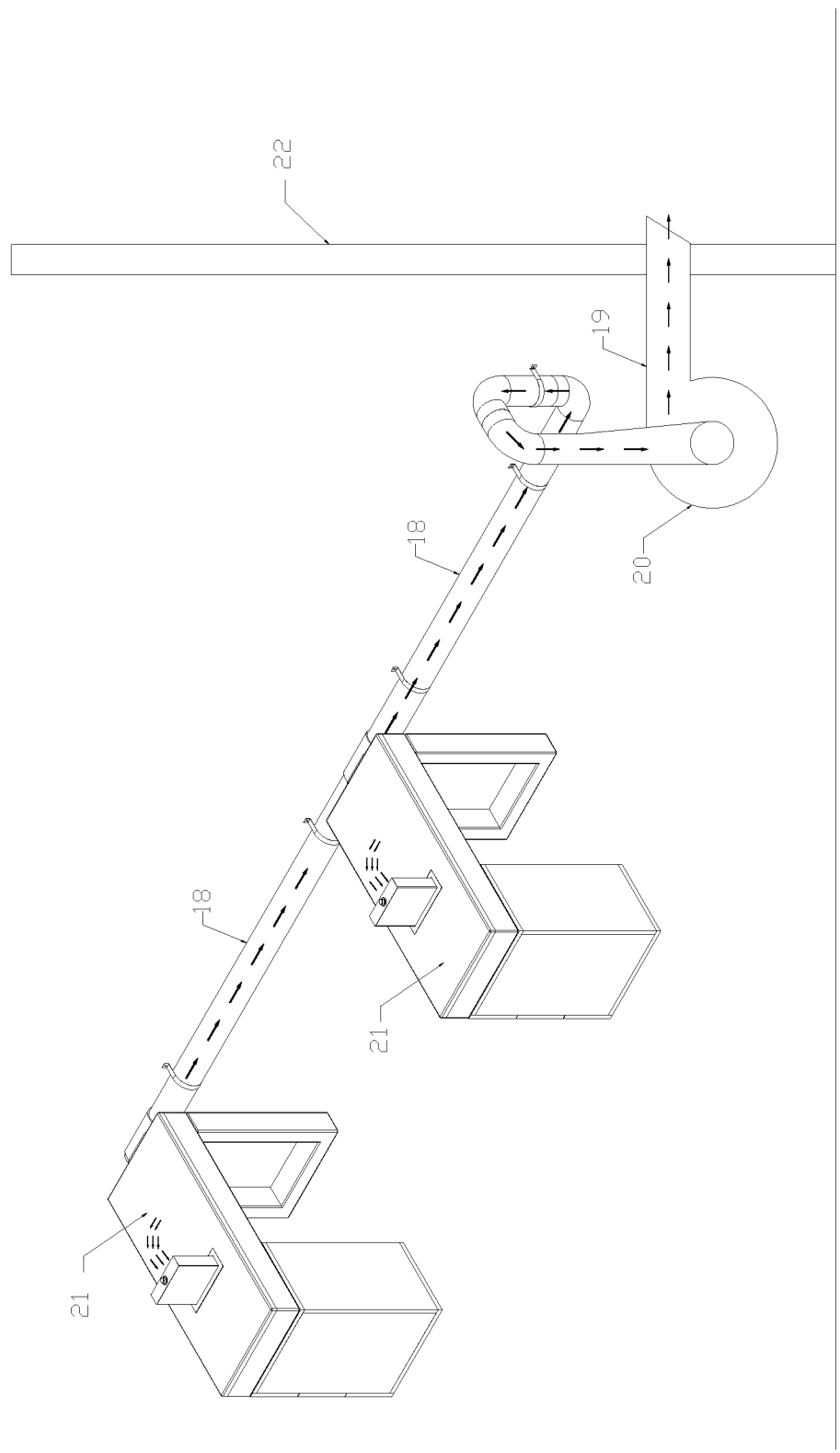
FIG. 16 depicts two separate manicure tables that are each equipped with a source capture device, shown in the active-state open position, the source capture devices are connected via a connection duct, the common duct is connected to an exhaust fan.

FIG. 16 depicts two separate manicure tables 21 that are each equipped with a source capture device, shown in the active-state open position. The source capture devices are connected via a connection duct 18, and the common connection duct is connected to an exhaust fan 20. The arrows in the diagram show the directional flow of air from the work area and through the system. Contaminated air, withdrawn from each respective work area, flows through the exhaust fan and is ultimately vented out of the salon via exhaust duct 19.

Figure 17:
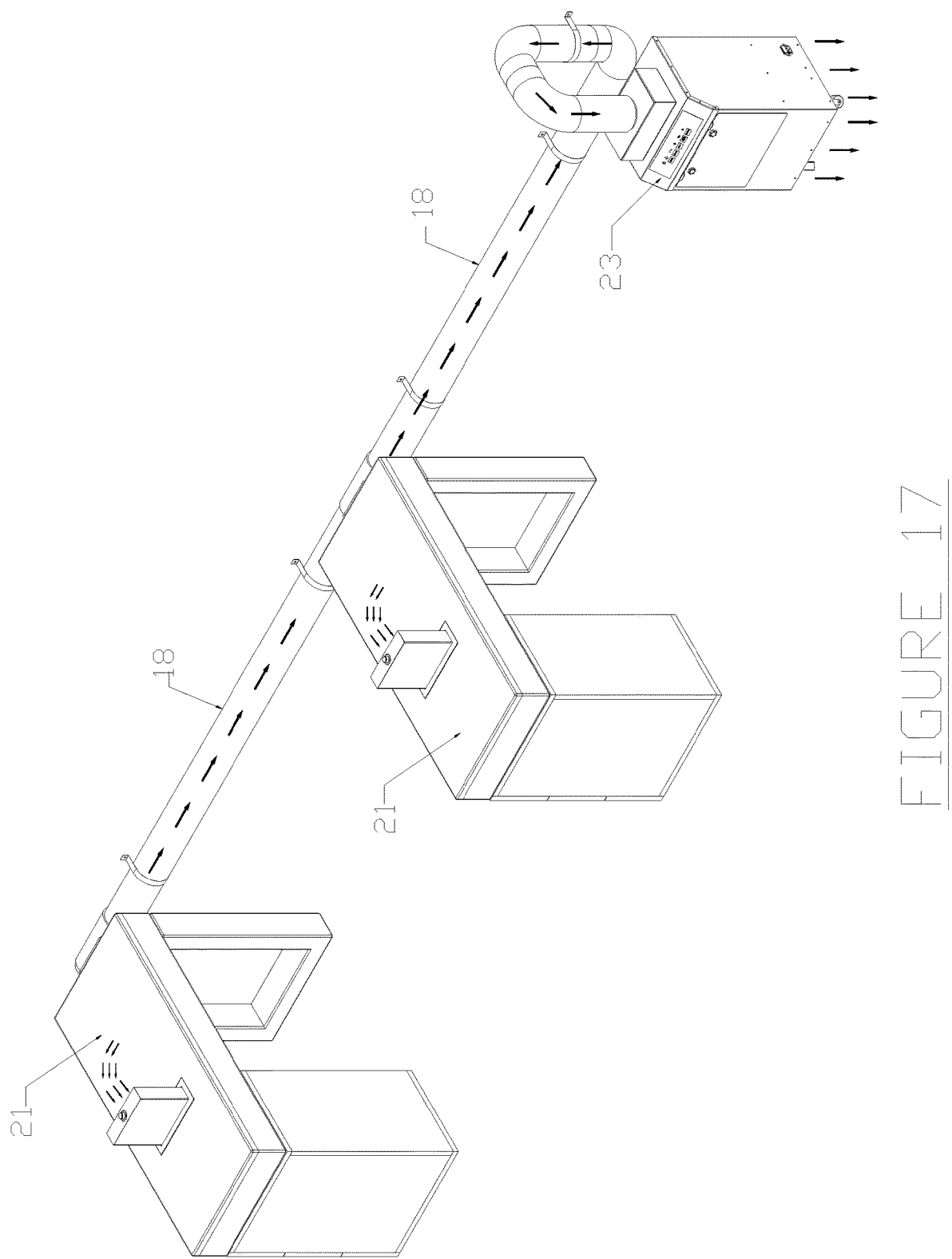
FIG. 17 depicts two separate manicure tables that are each equipped with a source capture device that is in the active-state open position the source capture devices are connected via a connection duct, the common duct is connected to the inlet of an air purifier.

FIG. 17 depicts two separate manicure tables 21, which are each equipped with a source capture device that is in the active-state open position. The source capture devices are connected via a connection duct 18, and the common duct is connected to the inlet of an air purifier 23. The arrows in the diagram show the directional flow of air from the work area and through the system. The air purifier filters the contaminated air and ultimately recycles clean air back into the salon.

Figure 18A:
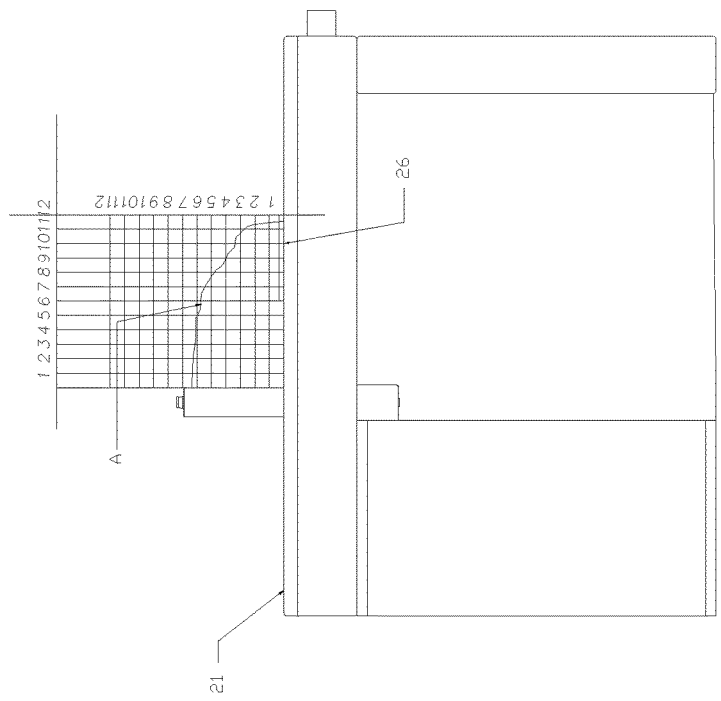
FIGS. 18a, 18b, 18c and 18d show the comparison of capture velocity between a manicure table with a source capture device and a manicure table with a simple cut-out.
Figure 18B:
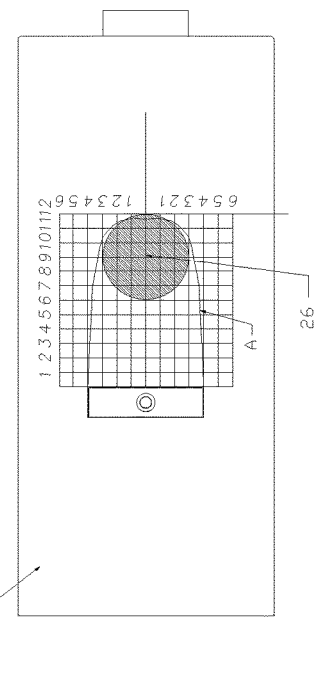
Figure 18C:
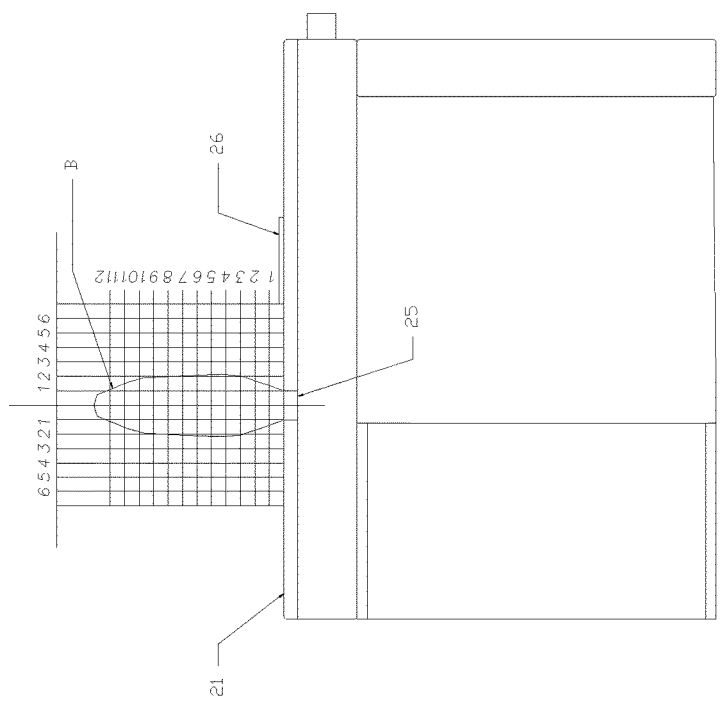
Figure 18D:
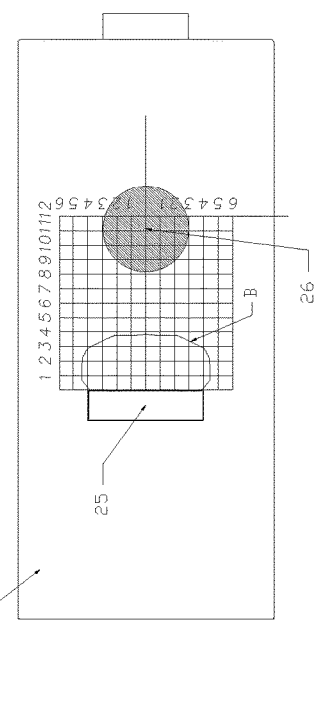

FIGS. 18a, 18b, 18c and 18d show the comparison of capture velocity between a manicure table 21 with a source capture device as shown in FIGS. 18c and 18d and a manicure table with a simple cut-out 25 that has the same 8"×2" cross sectional dimensions as the source capture device as shown in FIGS. 18a and 18b. The area to the left of line A and line B, respectively, is the space with the face velocity greater than 50 fpm, which is the sufficient rate to carry toxic chemical vapors and fine dust particles away from the work area 26. As shown, the area to the left of line A covers the entire work area and beyond, which is ideal. On the other hand, the area to the left of line B does not come near the work area, indicating that this arrangement is not suitable for the extraction of the toxic chemical vapors and fine dust particles from the work area.

FIGS. 19a and 19b depict a pedicure bench 27, with a pedicure chair 28, equipped with the source capture device.

FIG. 19a shows the device in the active-state open position, while FIG. 19b shows the device in the inactive-state closed position. The source capture device is mounted on the pedicure bench, adjacent to the pedicure sink 29, where pedicure work is typically done. A connection duct 18 connects the outlet port 9 of the source capture device to the exhaust fan 20. In the active-state open position the movable box 2 is raised to withdraw contaminated air from the work area. The arrows in the diagram show the directional flow of air from the work area and through the system. The air is ultimately exhausted outdoors via the exhaust duct 19. In the inactive-state closed position, the movable box is lowered into the stationary housing, such that the top panel 5 of the device is flush with the top of the pedicure bench, and it is concealed from view.

FIGS. 20a and 20b depict a pedicure bench 27, with a pedicure chair 28, equipped with the source capture device. FIG. 20a shows the device integrated with an air purifier 23 that recycles treated air back into the salon, while FIG. 20b shows the device integrated with an air purifier that exhausts treated air outdoors via the exhaust duct 19. The source capture device is mounted on the pedicure bench, adjacent to the pedicure sink 29, where pedicure work is typically done. A connection duct 18 connects the outlet port 9 of the source capture device to the inlet of the air purifier. In the active-state open position the movable box 2 is raised to withdraw contaminated air from the work area. The arrows in the diagram show the directional flow of air from the work area and through the system.

FIGS. 21a, 21b, 21c and 21d show the plan and elevation views of the source capture device with a gas cylinder actuator 30, which enables the raising and lowering of the movable box. FIGS. 21a and 21b depicts the device in the inactive-state closed position, while FIGS. 21c and 21d depicts the device in the active-state open position.

FIGS. 22a, 22b, 22c and 22d show elevation views of the source capture device with an electric actuator 31, which enables the raising and lowering of the movable box. FIGS. 22a and 22b depict the device in the inactive-state closed position, while FIGS. 22c and 22d depict the device in the active-state open position.

FIGS. 23a, 23b, 23c and 23d show elevation views of the source capture device with two (2) telescopic support arm 32, which provide support of the movable box within the fixed box as well as enables manual and stable raising and lowering of the movable box. FIGS. 23a and 23b depict the device in the inactive-state closed position, while FIGS. 23c and 23d depict the device in the active-state open position.

Figure 24B:
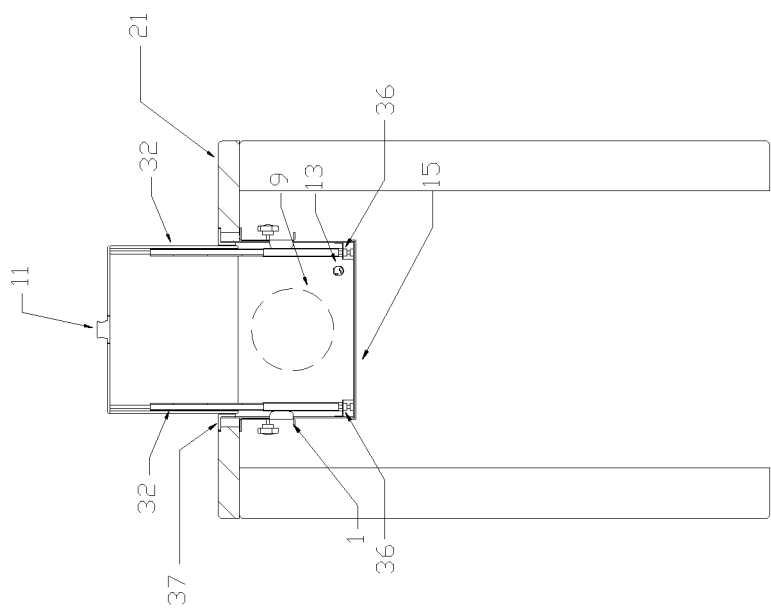
FIG. 24b depicts the mounting of the source capture device onto the table top by means of table mounting brackets, the device in the active-state open position.
Figure 24A:
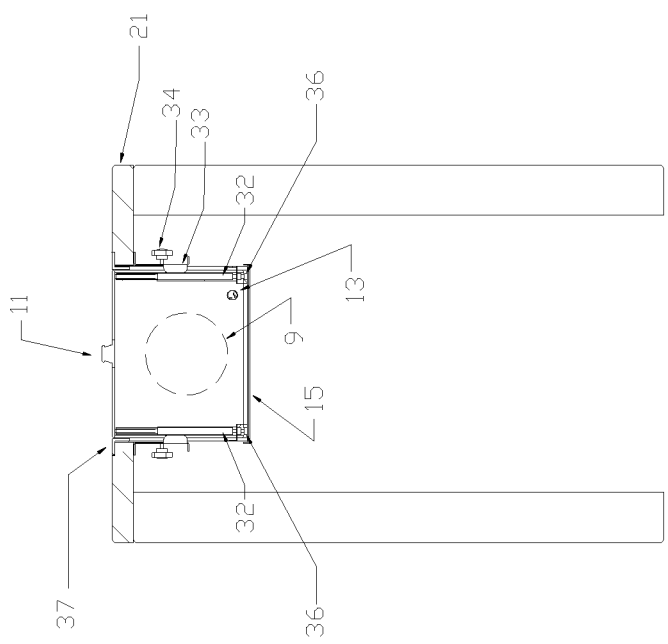
FIG. 24a depicts the mounting of the source capture device onto the table top by means of table mounting brackets, the device in the inactive-state closed position.

FIGS. 24a and 24b depict the mounting of the source capture device onto the table top 21 by means of table mounting brackets 33 on each side of the source capture device and can slide tightly against the bottom of the table snugly and is fixed in position using the thumb screws 34. Magnet 36 on each side of the fixed box 1 holds the cover 15. FIG. 24a depicts the device in the inactive-state closed position, while FIG. 24b depicts the device in the active-state open position.

Those skilled in the art to which the present invention pertains may make modifications resulting in other embodiments employing principles of the present invention without departing from its spirit or characteristics, particularly upon considering the foregoing teachings. Accordingly, the described embodiments are to be considered in all respects only as illustrative, and not restrictive, and the scope of the present invention is, therefore, indicated by the appended claims rather than by the foregoing description or drawings. Consequently, while the present invention has been described with reference to particular embodiments, modifications of structure, sequence, materials, and the like apparent to those skilled in the art still fall within the scope of the invention as claimed by the applicant.

What is claimed is:

1. A source capture device for installation on a manicure or pedicure table top consisting of a movable box and a fixed box, wherein the movable box can slide up and down inside the fixed box and the movable box has three sides and a closed top, while one face side and the bottom is open, and the fixed box top is open to allow the placement of the movable box in the fixed box, and the fixed box has an outlet opening to connect an air duct which is then connected to a suction fan to withdraw air from the open face of the movable box when the movable box is extended out of the fixed box, and then through the bottom opening of the movable box and into the fixed box and then out of the outlet opening, then through the connecting air duct and then into the suction fan, and then discharge the air either inside or outside the room, wherein the fixed box is to be installed on a manicure or pedicure table top in a manner to allow the top of the movable box to be flush with the manicure or pedicure table top in the closed position, and then allow the movable top to slide out of the fixed box vertically into the raised position, wherein the fixed box has a flange mounted on the open top and secured to the fixed box, where the movable box slides up and down through the opening in the flange, and the flange is then mounted flush on the manicure or pedicure table top, and the flange is secured to the underside of the manicure or pedicure table top by means of screws and tabs, wherein there are spring loaded pins mounted on each end of the flange, and matching holes on each side of the movable box, wherein the spring-loaded pins are engaged in the holes and keep the movable box in the raised position and prevent it from dropping downward, wherein there are tabs on the bottom of the movable box which act as stops against the flange to prevent the movable box from sliding out of the fixed box.

2. A source capture device for installation on a manicure or pedicure table top consisting of a movable box and a fixed box, where the movable box can slide up and down inside the fixed box and the movable box has three sides and a closed top, while one face side and the bottom is open, and the fixed box top is open to allow the placement of the movable box in the fixed box, and the fixed box has an outlet opening to connect an air duct which is then connected to a suction fan to withdraw air from the opening face of the movable box when the movable box is extended out of the fixed box, and then through the bottom opening of the movable box and into the fixed box and then out of the outlet opening, then through the connecting air and then into the suction fan and then discharge the air either inside or outside the room wherein the fixed box is to be installed on a manicure or pedicure table top in a manner to allow the top of the movable box to be flush with the manicure or pedicure table top in the closed position, and then allow the movable top to slide out of the fixed box vertically into the raised position, wherein there are guides provided on the inside of the flange with tracks on the side of the movable box that are aligned with these guides to allow smooth sliding of the movable box through the flange into the raised and closed position.

3. A source capture device for installation on a manicure or pedicure table top consisting of a movable box and a fixed box, where the movable box can slide up and down inside the fixed box and the movable box has three sides and a closed top, while one face side and the bottom is open, and the fixed box top is open to allow the placement of the movable box in the fixed box, and the fixed box has an outlet opening to connect an air duct which is then connected to a suction fan to withdraw air from the opening face of the movable box when the movable box is extended out of the fixed box, and then through the bottom opening of the movable box and into the fixed box and then out of the outlet opening, then through the connecting air and then into the suction fan and then discharge the air either inside or outside the room wherein the fixed box is to be installed on a manicure or pedicure table top in a manner to allow the top of the movable box to be flush with the manicure or pedicure table top in the closed position, and then allow the movable top to slide out of the fixed box vertically into the raised position, wherein there is a grab knob mounted on the top lid to allow a person to grab the knob and pull the movable box up into the raised position wherein the grab knob can be spring-loaded to be flush with the top lid when not in engaged, and then by pushing on it, it will spring up so that it can be grabbed to assist in pulling the movable box into the raised position.

4. A source capture device for installation on a manicure or pedicure table top consisting of a movable box and a fixed box, where the movable box can slide up and down inside the fixed box and the movable box has three sides and a closed top, while one face side and the bottom is open, and the fixed box top is open to allow the placement of the movable box in the fixed box, and the fixed box has an outlet opening to connect an air duct which is then connected to a suction fan to withdraw air from the opening face of the movable box when the movable box is extended out of the fixed box, and then through the bottom opening of the movable box and into the fixed box and then out of the outlet opening, then through the connecting air and then into the suction fan and then discharge the air either inside or outside the room wherein the fixed box is to be installed on a manicure or pedicure table top in a manner to allow the top of the movable box to be flush with the manicure or pedicure table top in the closed position, and then allow the movable top to slide out of the fixed box vertically into the raised position, wherein an LED light strip in mounted on the top side of the open face to provide adequate light on the work surface, wherein an on/off switch is also provided in one embodiment next to the LED light strip, to allow the turning on and off of the light, wherein the LED light can, in one embodiment, be a 12 V light, where a female socket is provided on the lower side of the fixed box and is wired to the ON/OFF switch and the LED light strip, and wherein a 12 Volt power adaptor with a male plug is to be plugged into the female socket.

5. A source capture device for installation on a manicure or pedicure table top consisting of a movable box and a fixed box, where the movable box can slide up and down inside the fixed box and the movable box has three sides and a closed top, while one face side and the bottom is open, and the fixed box top is open to allow the placement of the movable box in the fixed box, and the fixed box has an outlet opening to connect an air duct which is then connected to a suction fan to withdraw air from the opening face of the movable box when the movable box is extended out of the fixed box, and then through the bottom opening of the movable box and into the fixed box and then out of the outlet opening, then through the connecting air and then into the suction fan and then discharge the air either inside or outside the room wherein the fixed box is to be installed on a manicure or pedicure table top in a manner to allow the top of the movable box to be flush with the manicure or pedicure table top in the closed position, and then allow the movable top to slide out of the fixed box vertically into the raised position, wherein the fixed box has a flange mounted on the open top and secured to the fixed box, where the movable box slides up and down through the opening in the flange, and the flange is then mounted flush on the table top, and the flange is secured to the underside of table top by means of screws and tabs wherein there are spring loaded pins on each end of the flange, and matching holes on each side of the movable box, wherein the raised position of the movable box, the spring-loaded pins are engaged in the holes and keep the movable box in the raised position and prevent it from dropping downward.

6. A source capture device for installation on a manicure or pedicure table top consisting of a movable box and a fixed box, where the movable box can slide up and down inside the fixed box and the movable box has three sides and a closed top, while one face side and the bottom is open, and the fixed box top is open to allow the placement of the movable box in the fixed box, and the fixed box has an outlet opening to connect an air duct which is then connected to a suction fan to withdraw air from the opening face of the movable box when the movable box is extended out of the fixed box, and then through the bottom opening of the movable box and into the fixed box and then out of the outlet opening, then through the connecting air and then into the suction fan and then discharge the air either inside or outside the room wherein the fixed box is to be installed on a manicure or pedicure table top in a manner to allow the top of the movable box to be flush with the manicure or pedicure table top in the closed position, and then allow the movable top to slide out of the fixed box vertically into the raised position, wherein the movable box is supported in the fixed box by means of telescopic support arms on each side and is raised and lowered by manually pulling the movable box up by grabbing the grab knob and pulling it upward or lowering it by pushing down the movable box.

* * * * *